United States Patent
Tan et al.

(10) Patent No.: US 9,723,519 B2
(45) Date of Patent: Aug. 1, 2017

(54) PROTOCOL PROCESSING METHOD APPLIED WHEN CONTROL IS DECOUPLED FROM FORWARDING, CONTROL PLANE DEVICE, AND FORWARDING PLANE DEVICE

(71) Applicant: Huawei Technologies Co., Ltd., Shenzhen (CN)

(72) Inventors: Shiyong Tan, Beijing (CN); Hui Ni, Beijing (CN); Hui Cai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 173 days.

(21) Appl. No.: 14/611,946

(22) Filed: Feb. 2, 2015

(65) Prior Publication Data

US 2015/0156674 A1  Jun. 4, 2015

Related U.S. Application Data

(63) Continuation of application No. PCT/CN2012/079547, filed on Aug. 2, 2012.

(51) Int. Cl.
*H04W 28/18*  (2009.01)
*H04W 88/16*  (2009.01)
*H04W 12/06*  (2009.01)

(52) U.S. Cl.
CPC ........... *H04W 28/18* (2013.01); *H04W 88/16* (2013.01); *H04W 12/06* (2013.01)

(58) Field of Classification Search
None
See application file for complete search history.

(56) References Cited

U.S. PATENT DOCUMENTS 6,601,186 B1 * 7/2003 Fox ............... G06F 11/0709 714/4.12
7,609,700 B1 * 10/2009 Ying ............... H04L 65/80 370/260

(Continued)

FOREIGN PATENT DOCUMENTS

CN  101009644 A  8/2007
CN  100536464 C  9/2009

(Continued)

OTHER PUBLICATIONS

"3rd Generation Partnership Project; Technical Specification Group Core Network and Terminals; Interworking between the Public Land Mobile Network (PLMN) supporting packet based services and Packet Data Networks (PDN) (Release 11)," 3GPP TS 29.061, V11.1.0, Jun. 2012, 160 pages.

(Continued)

*Primary Examiner* — Candal Elpenord
(74) *Attorney, Agent, or Firm* — Slater Matsil, LLP

(57) ABSTRACT

The present invention discloses a protocol processing method applied when control is decoupled from forwarding, a control plane device, and a forwarding plane device. The method includes: causing a control plane device to send an indication to a forwarding plane device according to a processing manner of a packet service processing protocol, and to deliver a negotiation parameter of the packet service processing protocol to the forwarding plane device; and causing the control plane device to receive a negotiation result of the packet service processing protocol, and to create a data path between a user equipment and a network device. The negotiation result is uploaded by the forwarding plane device and obtained according to information that includes the negotiation parameter of the packet service processing protocol.

17 Claims, 13 Drawing Sheets

(56) References Cited

U.S. PATENT DOCUMENTS

| | | | |
|---|---|---|---|
| 7,990,993 B1* | 8/2011 | Ghosh | H04L 45/025 370/428 |
| 2004/0062254 A1 | 4/2004 | Kuzhiyil et al. | |
| 2004/0095881 A1 | 5/2004 | Borella et al. | |
| 2004/0236947 A1* | 11/2004 | Chaudhuri | H04L 63/08 713/169 |
| 2005/0201388 A1* | 9/2005 | Suh | H04L 12/4641 370/395.53 |
| 2006/0003765 A1* | 1/2006 | Patil | H04W 8/12 455/432.1 |
| 2007/0071035 A1* | 3/2007 | Evans | H04L 12/4633 370/474 |
| 2008/0259865 A1* | 10/2008 | Hurtta | H04L 12/5695 370/329 |
| 2008/0267143 A1* | 10/2008 | Pasanen | H04W 76/041 370/338 |
| 2009/0040988 A1* | 2/2009 | Mir | H04L 29/06 370/338 |
| 2011/0299613 A1* | 12/2011 | Duff | H04L 43/10 375/260 |
| 2012/0120932 A1 | 5/2012 | Liang et al. | |
| 2013/0288644 A1* | 10/2013 | Schroeder | H04W 12/06 455/411 |

FOREIGN PATENT DOCUMENTS

| | | |
|---|---|---|
| CN | 101990174 A | 3/2011 |
| EP | 0986222 A2 | 3/2000 |
| WO | 2006100500 A2 | 9/2006 |

OTHER PUBLICATIONS

"3rd Generation Partnership Project; Technical Specification Group Services and System Aspects; General Packet Radio Service (CPRS): Service Description; Stage 2 (Release 11)," 3GPP TS 23.060, V11.2.0, Jun. 2012, 335 pages.

McGregor, G., "The PPP Internet Protocol Control Protocol (IPCP)," Network Working Group, Request for Comments: 1332, Obsoletes: RFC 1172, May 1992, 15 pages.

Simpson, W., "The Point-to-Point Protocol (PPP)," Network Working Group, Request for Comments: 1661, STD: 51, Obsoletes: 1548, Category: Standards Track, Jul. 1994, 57 pages.

Hu, M. et al.: "Research and Implementation of Layer Two Tunneling Protocol (L2TP) on Carrier Network," 4th IEEE International Conference on Broadband Network and Multimedia Technology (IC-BNMT), Oct. 28-30, 2011, pp. 80-83.

Kelkar, R. et al.: "Mobile IP in 3G CDMA Networks," IEEE International Conference on Personal Wireless Communications, Dec. 15-17, 2002, pp. 41-44.

Simpson, W. "PPP in HDLC-Like Framing, Network Working Group," Category: Standards Track, Jul. 1994, pp. 1-26.

\* cited by examiner

PROTOCOL PROCESSING METHOD APPLIED WHEN CONTROL IS DECOUPLED FROM FORWARDING, CONTROL PLANE DEVICE, AND FORWARDING PLANE DEVICE

This application is a continuation of International Application No. PCT/CN2012/079547, filed on Aug. 2, 2012, which is hereby incorporated by reference in its entirety.

TECHNICAL FIELD

The present invention relates to the field of mobile network communication technologies, and in particular, to a protocol processing method applied when control is decoupled from forwarding, a control plane device, and a forwarding plane device.

BACKGROUND

FIG. 1 is a schematic structural diagram of an evolved network architecture in the prior art. The evolved network architecture includes a UE (user equipment), a GERAN (GSM/EDGE radio access network, where GSM refers to global system for mobile communication, and EDGE refers to enhanced data rates for GSM evolution), a UTRAN (universal terrestrial radio access network), an SGSN (serving GPRS support node), an MME (mobility management entity), an HSS (home subscriber server), an S-GW (serving gateway), a P-SW (packet data network gateway), and a PDN (packet data network).

After accessing an E-UTRAN through a radio air interface, the UE may get attached to an MME, and the MME obtains user subscription data and authentication information from an HSS server, to complete authentication on the UE. After completion of authentication, the user equipment or the MME may initiate a process of creating a bearer used to transmit user data. In this process, the MME sends a notification message to instruct the S-GW to create a bearer for the user, where the notification message carries information about an address of the P-GW and an address of an E-UTRAN network element of the user. The S-GW creates a bearer from the E-UTRAN to the P-GW for the user, where the bearer is used to transmit user data. The P-GW forwards downlink data, which comes from an external PDN, to the UE through the bearer, and forwards uplink data, which comes from the UE, to a corresponding PDN.

Also, the UE may also access a mobile network through the UTRAN/GERAN and the SGSN, and may create a GTP tunnel to the S-GW through the UTRAN/GERAN and the SGSN. The UTRAN may also create, by means of a Direct Tunnel, a GTP tunnel directly connected to the S-GW.

In an evolved network architecture, the MME only needs to process control plane signaling, and the S-GW and the P-GW are primarily responsible for forwarding user plane data. The S-GW and the P-GW may be combined into one network element, generally called a gateway. The gateway still needs to retain plenty of outbound signaling interfaces. The plenty of outbound signaling interfaces bring plenty of interface signaling. The signaling processing performance of a gateway with a dedicated hardware platform is not high and tends to become a bottleneck. To enable the gateway to process plenty of interface signaling, plenty of hardware such as universal computing processor chips needs to be added on the dedicated hardware platform. Consequently, the hardware platform of the gateway is rather complicated and too costly, which is adverse to promotion and deployment of mobile packet data networks.

SUMMARY

A main technical problem to be solved by the present invention is to provide a protocol processing method applied when control is decoupled from forwarding, a forwarding plane device, and a control plane device, so that the forwarding plane device can cooperate with the control plane device to perform negotiation of packet service processing protocols such as a PPP and an L2TP.

To solve the foregoing technical problem, a technical solution adopted by the present invention is to provide a protocol processing method applied when control is decoupled from forwarding, including: causing a control plane device to send an indication to a forwarding plane device according to a processing manner of a packet service processing protocol, and to deliver a negotiation parameter of the packet service processing protocol to the forwarding plane device; and causing the control plane device to receive a negotiation result of the packet service processing protocol, and to create a data path between a user equipment and a network device, where the negotiation result is uploaded by the forwarding plane device and obtained according to information that includes the negotiation parameter of the packet service processing protocol.

To solve the foregoing technical problem, another technical solution adopted by the present invention is to provide a protocol processing method applied when control is decoupled from forwarding, including: causing a forwarding plane device to receive an indication of a processing manner of a packet service processing protocol and a negotiation parameter of the packet service processing protocol that are delivered by a control plane device; and causing the forwarding plane device to perform negotiation according to the indication and with reference to information that includes the negotiation parameter of the packet service processing protocol, and to report a negotiation result to the control plane device to create a data path between a user equipment and a network device.

To solve the foregoing technical problem, another technical solution adopted by the present invention is to provide a protocol processing method applied when control is decoupled from forwarding, including: causing a control plane device to obtain a negotiation parameter of a packet service processing protocol that is configured by a forwarding plane device itself, and to instruct the forwarding plane device to transparently transmit a negotiation packet of the packet service processing protocol to the control plane device; and causing the control plane device to perform negotiation according to information that includes the negotiation parameter of the packet service processing protocol, and to deliver a negotiation result to the forwarding plane device to create a data path between a user equipment and a network device.

To solve the foregoing technical problem, another technical solution adopted by the present invention is to provide a protocol processing method applied when control is decoupled from forwarding, including: causing a forwarding plane device to transparently transmit a negotiation packet of a packet service processing protocol according to an indication of a control plane device, and to upload a negotiation parameter of the packet service processing protocol that is configured by the forwarding plane device itself, where the indication is an indication delivered by the control plane device according to a processing manner of the packet service processing protocol; and causing the forwarding plane device to receive a negotiation result of the packet service processing protocol, and to create a data path between a user equipment and a network device, where the negotiation result is delivered by the control plane device and obtained according to information that includes the negotiation parameter of the packet service processing protocol.

To solve the foregoing technical problem, another technical solution adopted by the present invention is to provide a control plane device, including: an indicating module, configured to send an indication to a forwarding plane device according to a processing manner of a packet service processing protocol, and deliver a negotiation parameter of the packet service processing protocol to the forwarding plane device; and a receiving module, configured to receive a negotiation result of the packet service processing protocol, and create a data path between a user equipment and a network device, where the negotiation result is uploaded by the forwarding plane device and obtained according to information that includes the negotiation parameter of the packet service processing protocol.

To solve the foregoing technical problem, another technical solution adopted by the present invention is to provide a control plane device, including: an indication obtaining module, configured to obtain a negotiation parameter of a packet service processing protocol that is configured by a forwarding plane device itself, and instruct the forwarding plane device to transparently transmit a negotiation packet of the packet service processing protocol to the control plane device; and a negotiating module, configured to perform packet service processing protocol negotiation according to information that includes the negotiation parameter of the packet service processing protocol, and deliver a negotiation result to the forwarding plane device to create a data path between a user equipment and a network device.

To solve the foregoing technical problem, another technical solution adopted by the present invention is to provide a forwarding plane device, including: a receiving module, configured to receive a negotiation parameter of a packet service processing protocol and an indication of a processing manner of the packet service processing protocol that are delivered by a control plane device; and a negotiating module, configured to perform negotiation according to the indication and with reference to information that includes the negotiation parameter of the packet service processing protocol, and report a negotiation result to the control plane device to create a data path between a user equipment and a network device.

To solve the foregoing technical problem, another technical solution adopted by the present invention is to provide a forwarding plane device, including: a transparent transmission module, configured to transparently transmit a negotiation packet of a packet service processing protocol according to an indication delivered by the control plane device to indicate a processing manner of the packet service processing protocol, and upload a negotiation parameter of the packet service processing protocol, where the negotiation parameter is configured by the forwarding plane device itself; and a receiving module, configured to receive a negotiation result of the packet service processing protocol, and create a data path between a user equipment and a network device, where the negotiation result is delivered by the control plane device and obtained according to information that includes the negotiation parameter of the packet service processing protocol.

The present invention brings the following beneficial effects: Different from the prior art, the control plane device in the present invention delivers the negotiation parameter of a packet service processing protocol to the forwarding plane device, the forwarding plane device performs packet service processing protocol negotiation, and the control plane device receives a negotiation result uploaded by the forwarding plane device after completion of the packet service processing protocol negotiation; or, the control plane device instructs the forwarding plane device to transparently transmit a negotiation packet of the packet service processing protocol to the control plane device, and obtains a negotiation parameter of the packet service processing protocol that is configured by the forwarding plane device itself, and the control plane device performs packet service processing protocol negotiation and delivers a negotiation result to the forwarding plane device to create a data path between the user equipment and the network device. In this way, when control is decoupled from forwarding on a gateway, the forwarding plane device can cooperate with the control plane device to perform packet service processing protocol negotiation.

DETAILED DESCRIPTION OF ILLUSTRATIVE EMBODIMENTS

The following describes the present invention in detail with reference to accompanying drawings and embodiments.

Figure 1:
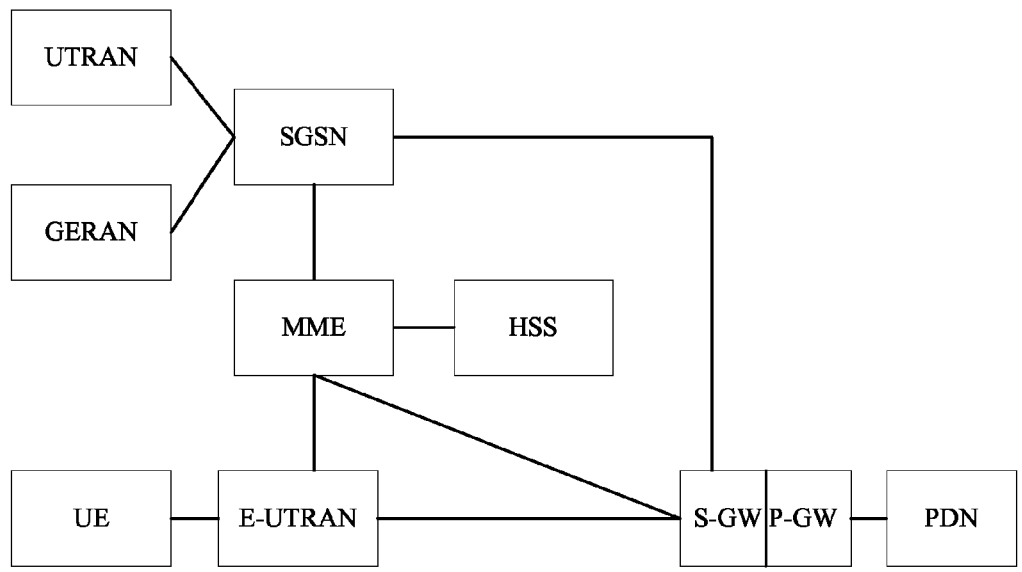
FIG. 1 is a schematic structural diagram of an evolved network architecture in the prior art.
Figure 2:
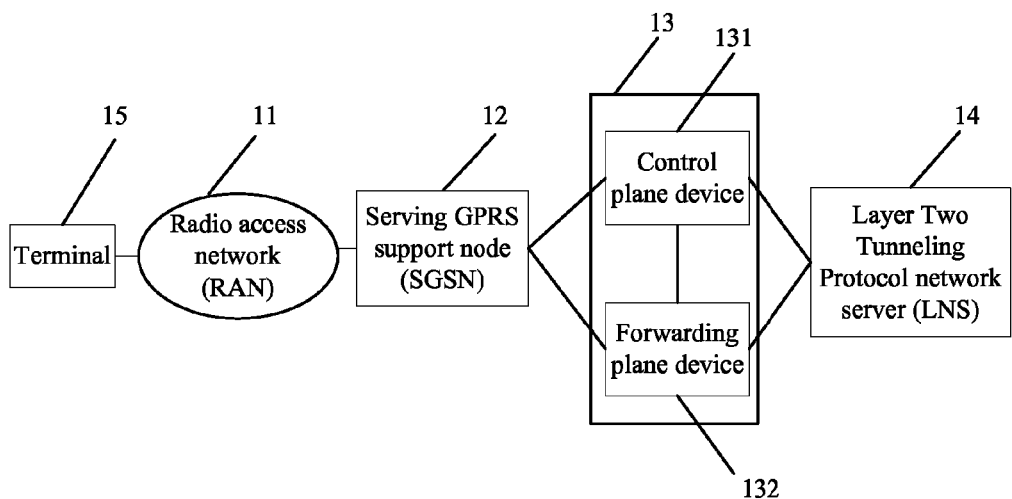
FIG. 2 is schematic structural diagram of a mobile communication network according to the present invention when control is decoupled from forwarding.

To enable readers to better understand the content of the embodiments of the present invention, the following briefly describes a mobile network structure when control is decoupled from forwarding on a gateway. FIG. 2 is schematic structural diagram of a mobile network according to the present invention when control is decoupled from forwarding. As shown in FIG. 2, the mobile network 10 includes a RAN (radio access network) 11, an SGSN (serving GPRS support node) 12, and a gateway 13. The gateway 13 includes a control plane device 131 and a forwarding plane device 132, where the control plane device 131 is used to process outbound signaling interaction, and the forwarding plane device 132 is used to forward data packet. A user equipment 15 is attached to the SGSN through the RAN, so that the user equipment 15 is attached to the mobile network 10. When the user equipment 15 needs to use higher layer service, a request may be initiated to the SGSN and further to the gateway 13 to create a service connection between the user equipment 15 and the gateway 13 or an LNS (Layer Two Tunneling Protocol network server) 14. Similarly, the gateway in an SAE (System Architecture Evolution, system architecture evolution) architecture may also include a control plane device and a forwarding plane device, where the control plane device is responsible for outbound signaling interaction, and the forwarding plane device is responsible for forwarding data packet.

Figure 3:
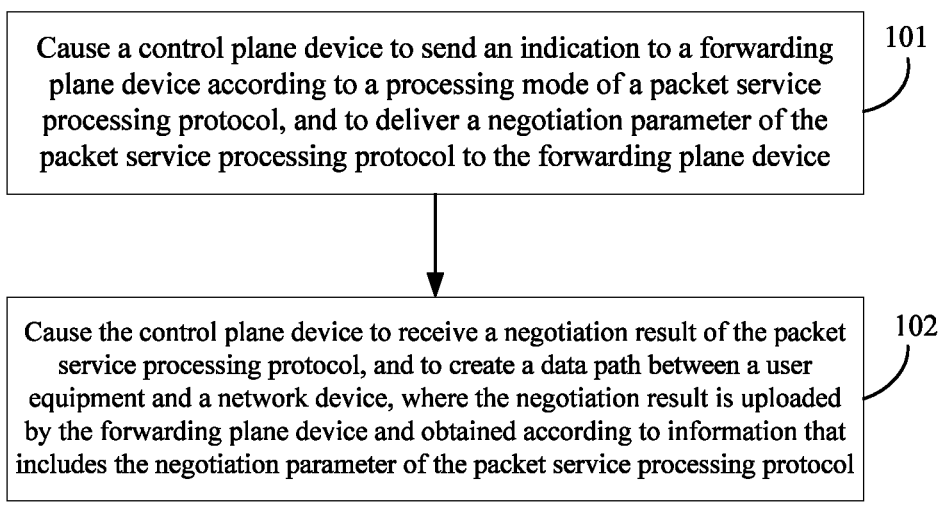
FIG. 3 is a flowchart of Embodiment 1 of a protocol processing method applied when control is decoupled from forwarding according to the present invention.

FIG. 3 is a flowchart of Embodiment 1 of a protocol processing method applied when control is decoupled from forwarding according to the present invention. As shown in FIG. 3, the method includes the following steps.

Step 101: Cause a control plane device to send an indication to a forwarding plane device according to a processing manner of a packet service processing protocol, and to deliver a negotiation parameter of the packet service processing protocol to the forwarding plane device.

A packet service processing protocol is a data transmission rule, and is primarily used to create a data transmission path between two or more than two networks or terminal devices, so that data can be transmitted between the networks or terminal devices. Packet service processing protocols include a PPP (Point-to-Point Protocol), an L2TP (Layer Two Tunneling Protocol), GRE (Generic Routing Encapsulation), and so on. When a data path of a packet service processing protocol needs to be created between networks or terminals, negotiation needs to be performed between the networks or terminals according to a negotiation parameter of the packet service processing protocol, and therefore, the networks or the terminal devices can determine how to encapsulate data when the opposite party is sending data, or determine how to decapsulate a data packet to obtain data when receiving data. In this way, the data can be transmitted between the networks or terminal devices, or a data path can be created between the networks or terminal devices.

Step 102: Cause the control plane device to receive a negotiation result of the packet service processing protocol, and to create a data path between a user equipment and a network device, where the negotiation result is uploaded by the forwarding plane device and obtained according to information that includes the negotiation parameter of the packet service processing protocol.

When control is decoupled from forwarding on the gateway, the control plane device is responsible for processing outbound signaling interaction, and the forwarding plane device is responsible for forwarding data packet. Therefore, after completion of negotiation, the forwarding plane device needs to report a negotiation result to the control plane device, and the control plane device performs management.

In the embodiment of the present invention, the control plane device delivers a negotiation parameter of the packet service processing protocol to the forwarding plane device, and sends an indication to the forwarding plane device according to a processing manner of the packet service processing protocol; and the forwarding plane device performs negotiation according to the negotiation parameter of the packet service processing protocol, and the control plane device receives a negotiation result that is reported by the forwarding plane device after completion of the negotiation, so as to create a data path between the user equipment and the network device. In this way, when control is decoupled from forwarding on the gateway, the control plane device can cooperate with the forwarding plane device to perform packet service processing protocol negotiation.

Figure 4:
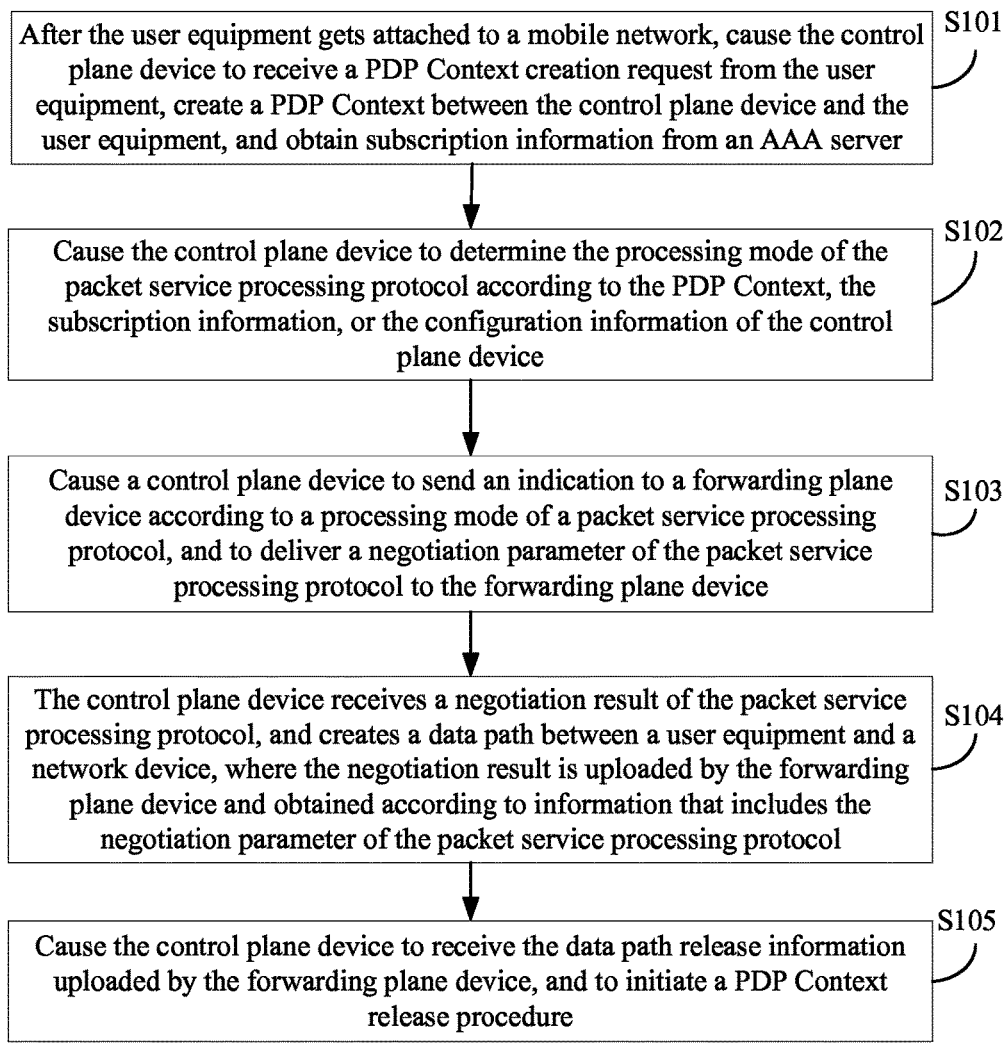
FIG. 4 is a flowchart of Embodiment 2 of a protocol processing method applied when control is decoupled from forwarding according to the present invention.

FIG. 4 is a flowchart of Embodiment 2 of a protocol processing method applied when control is decoupled from forwarding according to the present invention. As shown in FIG. 4, the method includes the following steps.

Step S101: After a user equipment gets attached to a mobile communication network, cause a control plane device to receive a PDP Context (packet data protocol context) creation request initiated by the user equipment, to create a PDP Context between the control plane device and the user equipment, and to obtain subscription information from an AAA (authentication authorization accounting) server.

The PDP Context serves as a GTP (General Packet Radio Service Tunneling Protocol, General Packet Radio Service Tunneling Protocol) bearer. One GTP bearer corresponds to one GTP tunnel, where the GTP tunnel is bidirectional and is jointly identified by IP addresses and TEIDs (Tunnel End Identifier, GTP tunnel end identifier) of devices on both sides. The user equipment initiates creation of a PDP Context, finds a corresponding control plane device, and creates a data path, so that the user equipment can communicate with an external network, where the PDP Context includes information such as the user equipment ID. The AAA server stores subscription information of all user equipments. The subscription information includes the processing manner of the packet service processing protocol that allows the user equipment to access an external network. The processing manner of the packet service processing protocol that allows the user equipment to access an external network may also be configured on the control plane device directly by means of a network management system, for example.

Step S102: Cause the control plane device to determine the processing manner of the packet service processing protocol according to the PDP Context, the subscription information, or the configuration information of the control plane device.

Step S103: Cause a control plane device to send an indication to a forwarding plane device according to a processing manner of a packet service processing protocol, and to deliver a negotiation parameter of the packet service processing protocol to the forwarding plane device.

The packet service processing protocol is a data transmission rule, and is primarily used to create a data path between networks or terminal devices, so that data can be transmitted between the networks or terminal devices. In order to create a data path of the packet service processing protocol between the networks or terminal devices, the networks or terminal devices need to negotiate according to the negotiation parameter of the packet service processing protocol, so that the networks and the terminal devices can determine how the opposite party handles data.

Step S104: Cause the control plane device to receive a negotiation result of the packet service processing protocol, and to create a data path between a user equipment and a network device, where the negotiation result is uploaded by the forwarding plane device and obtained according to information that includes the negotiation parameter of the packet service processing protocol.

When control is decoupled from forwarding on the gateway, the control plane device is responsible for processing outbound signaling interaction, and the forwarding plane device is responsible for forwarding data packet. Therefore, after completion of negotiation, the forwarding plane device needs to report a negotiation result to the control plane device, and the control plane device performs management.

In the embodiment of the present invention, the packet service processing protocol may be a PPP, an L2TP, GRE, and so on. The PPP processing manners include PPP access, PPP relay, PPP regeneration, and so on.

Step S102 may specifically be: Cause the control plane device to determine PPP access as the processing manner of the packet service processing protocol according to the PDP Context, the subscription information, or the configuration information of the control plane device. Step S103 may specifically be: Cause the control plane device to send an indication to a forwarding plane device according to the PPP access, and to deliver a first PPP negotiation parameter to the forwarding plane device. Step S104 may specifically be: Cause the control plane device to receive a negotiation result and to create a data path between the user equipment and the forwarding plane device, where the negotiation result is reported by the forwarding plane device after PPP negotiation is performed with the user equipment according to the first PPP negotiation parameter and a second PPP negotiation parameter that is configured by the forwarding plane device itself.

Further, step S102 may specifically be: Cause the control plane device to determine PPP relay as the processing manner of the packet service processing protocol according to the PDP Context, the subscription information, or the configuration information of the control plane device. Step S104 may specifically be: Cause the control plane device to receive a negotiation result, and to create a data path between the user equipment and the LNS server, where the forwarding plane device performs L2TP negotiation with an LNS server according to an L2TP negotiation parameter, and creates an L2TP data path between the forwarding plane device and the LNS server, and the forwarding plane device provides a LAC function according to the first PPP negotiation parameter and the second PPP negotiation parameter that is configured by the forwarding plane device itself, so that the user equipment can perform PPP negotiation between the user equipment and the LNS server by using the L2TP data path and the forwarding plane device reports the negotiation result.

The providing, by the forwarding plane device, a LAC function according to the first PPP negotiation parameter and the second PPP negotiation parameter includes: receiving, by the forwarding plane device, a PPP data packet from the user equipment, encapsulating the PPP data packet into an L2TP data packet according to the L2TP protocol, and sending the data packet to the LNS server; and, receiving, by the forwarding plane device, the L2TP data packet from the LNS server, decapsulating the L2TP data packet into a PPP data packet, and sending the data packet to the user equipment.

Further, step S102 may specifically be: Cause the control plane device to determine PPP regeneration as the processing manner of the packet service processing protocol according to the PDP Context, the subscription information, or the configuration information of the control plane device. Further, step S104 may specifically be: Cause the control plane device to receive a negotiation result, and to create a data path between the user equipment and the LNS server, where the forwarding plane device performs L2TP negotiation with an LNS server according to an L2TP negotiation parameter, and creates an L2TP data path between the forwarding plane device and the LNS server, so that the forwarding plane device can perform PPP negotiation with the LNS server by using the L2TP data path according to the first PPP negotiation parameter and the second PPP negotiation parameter that is configured by the forwarding plane device itself, and reports the negotiation result.

Optionally, the control plane device sends an IP address obtained in the PPP negotiation process to the user equipment, and the forwarding plane device provides a LAC function according to the first PPP negotiation parameter and the second PPP negotiation parameter that is configured by the forwarding plane device itself. The providing, by the forwarding plane device, a LAC function according to the first PPP negotiation parameter and the second PPP negotiation parameter includes: encapsulating, by the forwarding plane device, an IP data packet received from the user equipment into a PPP data packet according to the PPP protocol first, and then encapsulating the PPP data packet into an L2TP data packet according to the L2TP protocol and sending the data packet to an LNS server; and, decapsulating, by the forwarding plane device, the L2TP data packet received from the LNS server into a PPP data packet according to the L2TP protocol, decapsulating the PPP data packet into an IP data packet according to the PPP protocol, and sending the data packet to the user equipment.

The first PPP negotiation parameter and the second PPP negotiation parameter make up a complete PPP negotiation parameter, and the second PPP negotiation parameter is a negotiation parameter configured by the forwarding plane device itself. The first PPP negotiation parameter includes an IP address, a PPP authentication manner, a PPP authentication parameter, a PPP heartbeat cycle, and so on. The L2TP negotiation parameter includes an LNS address or address list, an L2TP authentication manner, an L2TP authentication parameter, an L2TP heartbeat cycle, and so on. The second PPP negotiation parameter includes: an MRU (maximum receiving unit), Protocol-Field-Compression (indicating that a protocol field in a PPP packet header is compressed), and Address-and-Control-Field-Compression (indicating whether an address field and a control field in the PPP packet header are compressed), and IP-Compression-Protocol (indicating whether an IP packet is compressed), and so on.

The first PPP negotiation parameter and the L2TP negotiation parameter are negotiation parameters obtained by the control plane device from subscription information, local configuration of a gateway, or a DHCP (Dynamic Host Configuration Protocol) server, and when the processing manner of the packet service processing protocol is PPP access or PPP regeneration, the negotiation parameter of the packet service processing protocol, which is delivered by the control plane device to the forwarding plane device, may be the first PPP negotiation parameter and the L2TP negotiation parameter. The L2TP negotiation parameter may also be directly configured onto the forwarding plane device through the gateway, and when the processing manner of the packet service processing protocol is PPP access or PPP regeneration, the negotiation parameter of the packet service processing protocol, which is delivered by the control plane device to the forwarding plane device, may also be the first PPP negotiation parameter only.

Step S105: Cause the control plane device to receive data path release information uploaded by the forwarding plane device, and to initiate a PDP Context release procedure.

The data path is faulty due to occurrence of an exception, for example, restart of the user equipment leads to exception of the data path. A faulty data path is unavailable for transmitting data, and is irrecoverable. For the faulty data path, the networks or terminal devices on both sides of the data path need to release the data path to recycle resources. In the embodiment of the present invention, the forwarding plane device may detect heartbeat exception such as PPP heartbeat exception and L2TP heartbeat exception in the data path to detect link faults in the data path, and report the link faults as data path release information to the control plane device. Similarly, when the use of the data path is complete, the data path needs to be released to recycle resources. The user equipment or the LNS server may initiate a procedure of terminating the data path. For example, the user equipment initiates an LCP termination procedure, the LNS server initiates an L2TP session termination procedure, the LNS server initiates an L2TP tunnel termination procedure, and so on. The forwarding plane device reports the received termination information as data path release information to the control plane device, and the control plane device initiates a PDP Context release procedure to recycle resources.

In the embodiment of the present invention, the control plane device sends an indication to the forwarding plane device according to a determined processing manner of the packet service processing protocol, and delivers a negotiation parameter of the packet service processing protocol to the forwarding plane device; the forwarding plane device performs negotiation; and the control plane device receives a negotiation result uploaded by the forwarding plane device, and creates a data path between the user equipment and the network device. In this way, when control is decoupled from forwarding on the gateway, the control plane device can cooperate with the forwarding plane device to perform packet service processing protocol negotiation.

Figure 5:
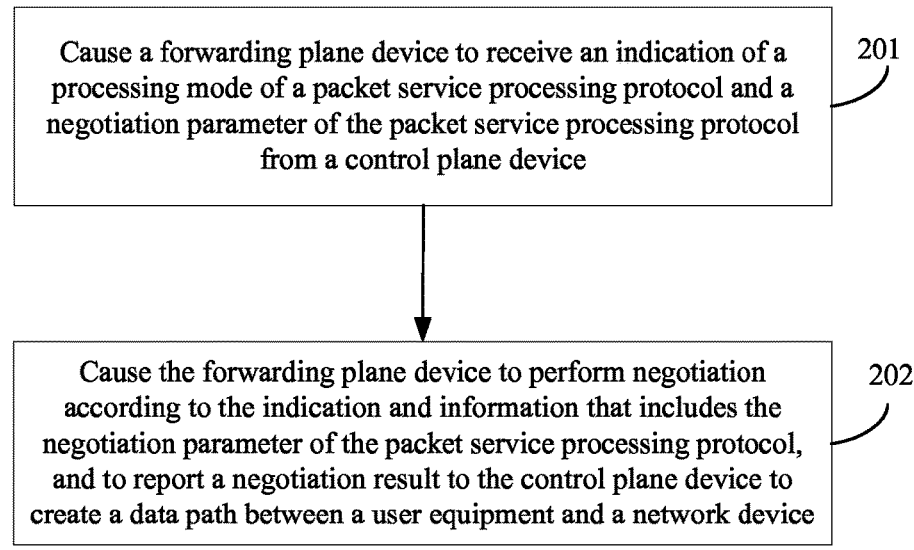
FIG. 5 is a flowchart of Embodiment 3 of a protocol processing method applied when control is decoupled from forwarding according to the present invention.

The present invention further provides an embodiment of a protocol processing method applied when control is decoupled from forwarding. FIG. 5 is a flowchart of Embodiment 3 of a protocol processing method applied when control is decoupled from forwarding according to the present invention. As shown in FIG. 5, the method includes:

Step 201: Cause a forwarding plane device to receive an indication of a processing manner of a packet service processing protocol and a negotiation parameter of the packet service processing protocol that are delivered by a control plane device.

The packet service processing protocol is a data transmission rule, and is primarily used to create a data path between networks or terminal devices. Before a data path is created between the networks or terminal devices, both parties need to negotiate according to the negotiation parameter of the packet service processing protocol, so that both parties determine how the opposite party handles data.

Step 202: Cause the forwarding plane device to perform negotiation according to the indication and with reference to information that includes the negotiation parameter of the packet service processing protocol, and to report a negotiation result to the control plane device to create a data path between a user equipment and a network device.

When control is decoupled from forwarding on the gateway, the control plane device is responsible for processing outbound signaling interaction, and the forwarding plane device is responsible for forwarding data packet. Therefore, after completion of negotiation, the forwarding plane device needs to report a negotiation result to the control plane device, and the control plane device performs management.

In the embodiment of the present invention, the forwarding plane device receives the negotiation parameter of the packet service processing protocol and the indication of a processing manner of the packet service processing protocol that are delivered by the control plane device, performs negotiation according to the indication and with reference to information that includes the negotiation parameter of the packet service processing protocol, and reports a negotiation result to the control plane device to create a data path between the user equipment and the network device. In this way, when control is decoupled from forwarding on a gateway, the forwarding plane device can cooperate with the control plane device to perform packet service processing protocol negotiation.

Figure 6:
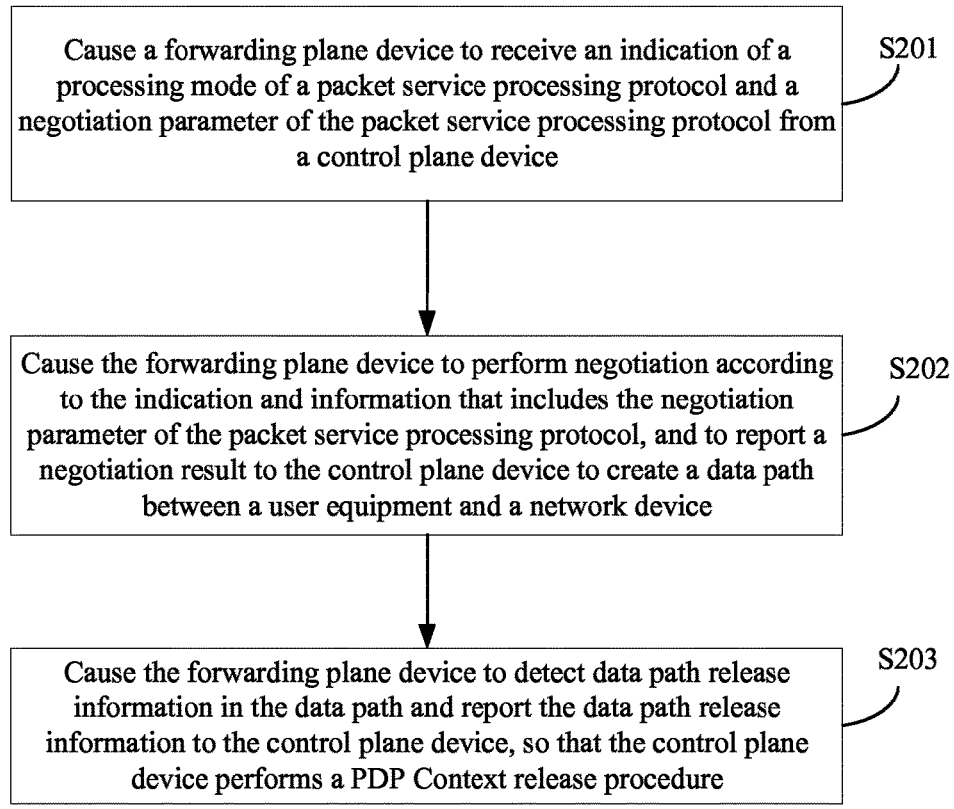
FIG. 6 is a flowchart of Embodiment 4 of a protocol processing method applied when control is decoupled from forwarding according to the present invention.

FIG. 6 is a flowchart of Embodiment 4 of a protocol processing method applied when control is decoupled from forwarding according to the present invention. As shown in FIG. 6, the method includes the following steps.

Step S201: Cause a forwarding plane device to receive an indication of a processing manner of a packet service processing protocol and a negotiation parameter of the packet service processing protocol that are delivered by a control plane device.

The packet service processing protocol is a data transmission rule, and is primarily used to create a data path between networks or terminal devices. Before a data path is created between the networks or terminal devices, both parties need to negotiate according to the negotiation parameter of the packet service processing protocol, so that both parties determine how the opposite party handles data.

Step S202: Cause the forwarding plane device to perform negotiation according to the indication and with reference to information that includes the negotiation parameter of the packet service processing protocol, and to report a negotiation result to the control plane device to create a data path between a user equipment and a network device.

When control is decoupled from forwarding on the gateway, the control plane device is responsible for processing outbound signaling interaction, and the forwarding plane device is responsible for forwarding data packet. Therefore, after completion of negotiation, the forwarding plane device needs to report a negotiation result to the control plane device, and the control plane device performs management.

In the embodiment of the present invention, the packet service processing protocol may be a PPP, an L2TP, GRE, and so on. The processing manners of the packet service processing protocol include PPP access, PPP relay, PPP regeneration, and so on.

When the processing manner of the packet service processing protocol is PPP access, step S201 may specifically be: Cause the forwarding plane device to receive a first PPP negotiation parameter and a PPP access indication that are delivered by the control plane device; and step S202 may specifically be: Cause the forwarding plane device to perform PPP negotiation with the user equipment according to the first PPP negotiation parameter and a second PPP negotiation parameter that is configured by the forwarding plane device itself, and to report a negotiation result to the control plane device to create a data path between the user equipment and the forwarding plane device.

When the processing manner of the packet service processing protocol is PPP relay, step S202 may specifically be: Cause the forwarding plane device to perform L2TP negotiation with an LNS server according to an L2TP negotiation parameter, and to create an L2TP data path between the forwarding plane device and the LNS server, where the forwarding plane device provides a LAC function according to the first PPP negotiation parameter and the second PPP negotiation parameter that is configured by the forwarding plane device itself, so that the user equipment and the LNS server can use the L2TP data path to perform PPP negotiation and report a negotiation result to the control plane device to create a data path between the user equipment and the LNS server. The providing, by the forwarding plane device, a LAC function according to the first PPP negotiation parameter and the second PPP negotiation parameter that is configured by the forwarding plane device itself includes: encapsulating, by the forwarding plane device, a PPP data packet received from the user equipment into an L2TP data packet according to the L2TP protocol, and sending the data packet to the LNS server; and, decapsulating, by the forwarding plane device, the L2TP data packet received from the LNS server into a PPP data packet, and sending the data packet to the user equipment.

When the processing manner of the packet service processing protocol is PPP relay, step S202 may specifically be: Cause the forwarding plane device to perform L2TP negotiation with an LNS server according to an L2TP negotiation parameter, and to create an L2TP data path between the forwarding plane device and the LNS server, so that the forwarding plane device and the LNS server use the L2TP data path to perform PPP negotiation according to the first PPP negotiation parameter and the second PPP negotiation parameter that is configured by the forwarding plane device itself, and report a negotiation result to the control plane device.

Optionally, the control plane device sends the IP address obtained in the PPP negotiation process to the user equipment, and the forwarding plane device provides a LAC function according to the first PPP negotiation parameter and the second PPP negotiation parameter that is configured by the forwarding plane device itself, and creates a data path between the user equipment and the LNS server. The providing, by the forwarding plane device, a LAC function according to the first PPP negotiation parameter and the second PPP negotiation parameter that is configured by the forwarding plane device itself includes: encapsulating, by the forwarding plane device, an IP data packet received from the user equipment into a PPP data packet according to the PPP protocol, and then encapsulating the PPP data packet into an L2TP data packet according to the L2TP protocol, and sending the data packet to the LNS server; and, decapsulating, by the forwarding plane device, the L2TP data packet received from the LNS server into a PPP data packet, and decapsulating the PPP data packet into an IP data packet according to the PPP protocol, and sending the data packet to the user equipment.

The first PPP negotiation parameter and the second PPP negotiation parameter make up a complete PPP negotiation parameter, and the second PPP negotiation parameter is a negotiation parameter configured by the forwarding plane device itself. The first PPP negotiation parameter includes an IP address, a PPP authentication manner, a PPP authentication parameter, a PPP heartbeat cycle, and so on. The L2TP negotiation parameter includes an LNS address or address list, an L2TP authentication manner, an L2TP authentication address, an L2TP heartbeat cycle, and so on. The second PPP negotiation parameter includes an MRU, Protocol-Field-Compression, Address-and-Control-Field-Compression, IP-Compression-Protocol, and so on.

The first PPP negotiation parameter and the L2TP negotiation parameter are negotiation parameters obtained by the control plane device from subscription information, local configuration of a gateway, or a DHCP server. When the processing manner of the packet service processing protocol is PPP access or PPP regeneration, the negotiation parameter of the packet service processing protocol, which is received by the forwarding plane device and delivered by the control plane device, may be the first PPP negotiation parameter and the L2TP negotiation parameter. The L2TP negotiation parameter may also be directly configured onto the forwarding plane device through the gateway. When the processing manner of the packet service processing protocol is PPP access or PPP regeneration, the negotiation parameter of the packet service processing protocol, which is received by the forwarding plane device and delivered by the control plane device, may also be the first PPP negotiation parameter only.

Step S203: Cause the forwarding plane device to detect data path release information in the data path and to report the data path release information to the control plane device, so that the control plane device performs a PDP Context release procedure.

In the embodiment of the present invention, the data path release information includes PPP heartbeat exception information, information about an LCP termination procedure initiated by the user equipment, L2TP heartbeat exception information in the data path, information about an L2TP session termination procedure initiated by the LNS, or information about an L2TP tunnel termination procedure initiated by the LNS, and so on.

In the embodiment of the present invention, the forwarding plane device receives the negotiation parameter of the packet service processing protocol and the indication of a processing manner of the packet service processing protocol that are delivered by the control plane device, performs negotiation according to the indication and with reference to information that includes the negotiation parameter of the packet service processing protocol, and reports a negotiation result to the control plane device to create a data path between the user equipment and the network device. In this way, when control is decoupled from forwarding on the gateway, the control plane device can cooperate with the forwarding plane device to perform packet service processing protocol negotiation.

Figure 7:
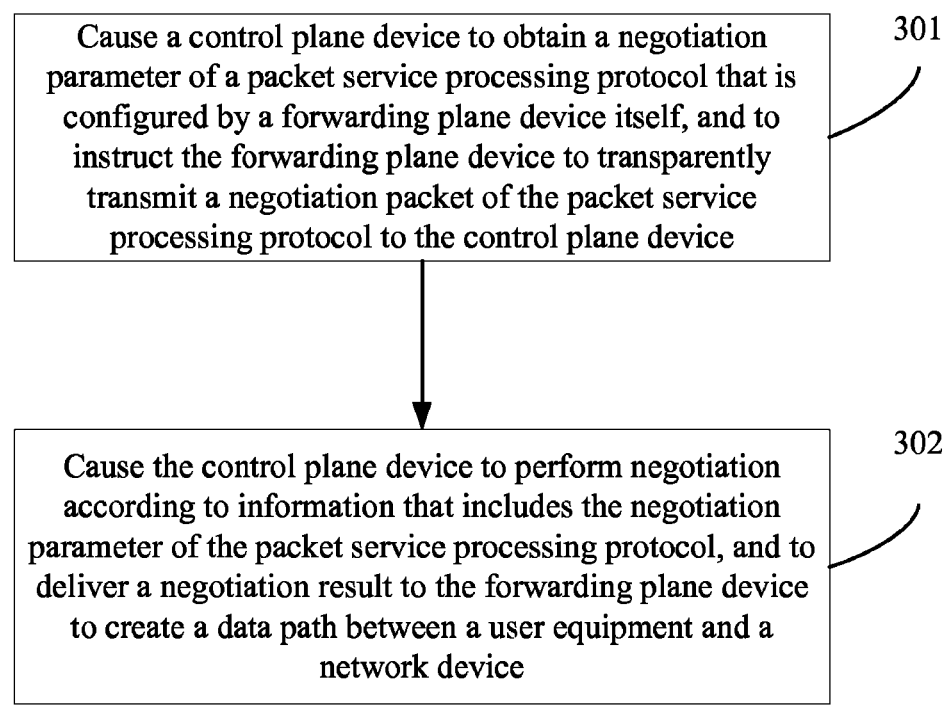
FIG. 7 is a flowchart of Embodiment 5 of a protocol processing method applied when control is decoupled from forwarding according to the present invention.

The present invention further provides an embodiment of a protocol processing method applied when control is decoupled from forwarding. FIG. 7 is a flowchart of Embodiment 5 of a protocol processing method applied when control is decoupled from forwarding according to the present invention. As shown in FIG. 7, the method includes the following steps.

Step 301: Cause a control plane device to obtain a negotiation parameter of a packet service processing protocol that is configured by a forwarding plane device itself, and to instruct the forwarding plane device to transparently transmit a negotiation packet of the packet service processing protocol to the control plane device.

In an architecture with control decoupled from forwarding on the gateway, the control plane device is primarily responsible for outbound signaling interaction, and instructs the forwarding plane device to transparently transmit a negotiation packet of the packet service processing protocol to the control plane device, so that the control plane device is capable of performing packet service processing protocol negotiation. The packet service processing protocol is a data transmission rule, and is primarily used to create a data path between networks or terminal devices. Before a data path is created between the networks or terminal devices, both parties need to negotiate according to the negotiation parameter of the packet service processing protocol, so that both parties determine how the opposite party handles data.

Step 302: Cause the control plane device to perform negotiation according to information that includes the negotiation parameter of the packet service processing protocol, and to deliver a negotiation result to the forwarding plane device to create a data path between a user equipment and a network device.

The forwarding plane device is responsible for forwarding data packet. After performing packet service processing protocol negotiation, the control plane device needs to deliver a negotiation result to the forwarding plane device, and subsequently the forwarding plane device is responsible for forwarding the data packet of the packet service processing protocol.

In the embodiment of the present invention, the control plane device instructs the forwarding plane device to transparently transmit the negotiation packet of the packet service processing protocol to the control plane device, and obtains the negotiation parameter of the packet service processing protocol that is configured by the forwarding plane device itself; and the control plane device performs packet service processing protocol negotiation, and delivers a negotiation result to the forwarding plane device to create a data path between the user equipment and the network device. In this way, when control is decoupled from forwarding on the gateway, the control plane device can cooperate with the forwarding plane device to perform packet service processing protocol negotiation.

Figure 8:
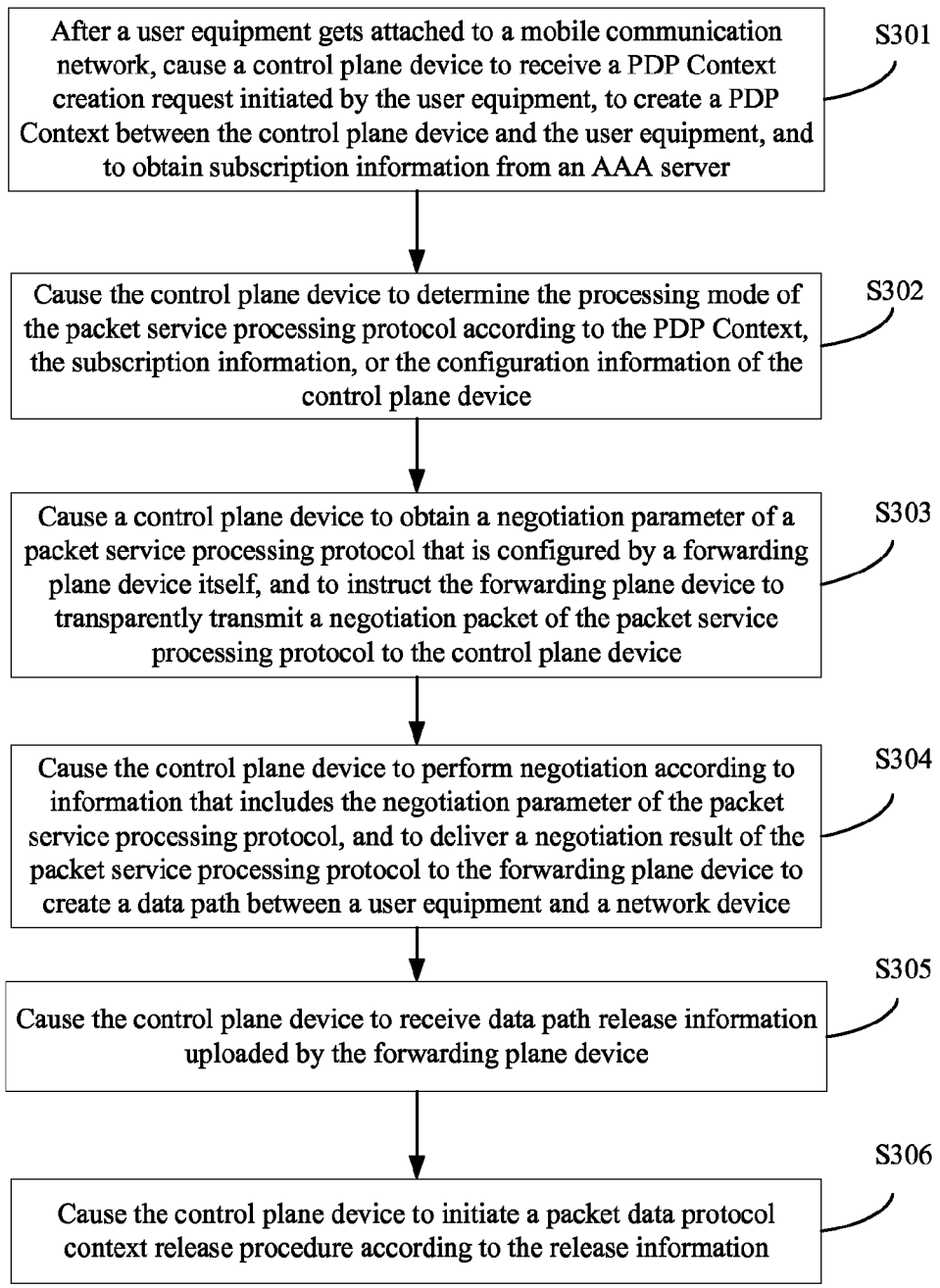
FIG. 8 is a flowchart of Embodiment 6 of a protocol processing method applied when control is decoupled from forwarding according to the present invention.

FIG. 8 is a flowchart of Embodiment 6 of a protocol processing method applied when control is decoupled from forwarding according to the present invention. As shown in FIG. 8, the method includes the following steps.

Step S301: After a user equipment gets attached to a mobile communication network, cause a control plane device to receive a PDP Context creation request initiated by the user equipment, to create a PDP Context between the control plane device and the user equipment, and to obtain subscription information from an AAA server.

The PDP Context includes information such as an APN, and the AAA server stores subscription information of the user equipment. The subscription information includes the processing manner of the packet service processing protocol that allows the user equipment to access an external network. The processing manner of the packet service processing protocol that allows the user equipment to access an external network may also be configured on the control plane device directly by means of a network management system, for example.

Step S302: Cause the control plane device to determine the processing manner of the packet service processing protocol according to the PDP Context, the subscription information, or the configuration information of the control plane device.

Step S303: Cause a control plane device to obtain a negotiation parameter of a packet service processing protocol that is configured by a forwarding plane device itself, and to instruct the forwarding plane device to transparently transmit a negotiation packet of the packet service processing protocol to the control plane device.

The packet service processing protocol is a data transmission rule, and is primarily used to create a data path between networks or terminal devices. Before a data path is created between the networks or terminal devices, both parties need to negotiate according to the negotiation parameter of the packet service processing protocol, so that both parties determine how the opposite party handles data.

Step S304: Cause the control plane device to perform negotiation according to information that includes the negotiation parameter of the packet service processing protocol, and to deliver a negotiation result of the packet service processing protocol to the forwarding plane device to create a data path between a user equipment and a network device.

In the embodiment of the present invention, the packet service processing protocols include a PPP, an L2TP, GRE, and so on, and the processing manners of the packet service processing protocol include PPP access, PPP relay, PPP regeneration, and so on.

When the processing manner of the packet service processing protocol is PPP access, the negotiation parameter of the packet service processing protocol, which is obtained by the control plane device and configured by the forwarding plane device itself, is a second PPP negotiation parameter, step S302 may specifically be: Cause the control plane device to determine PPP access as the processing manner of the packet service processing protocol according to the PDP Context, the subscription information, or the configuration information of the control plane device; step S304 may specifically be: Cause the control plane device to perform PPP negotiation with the user equipment according to the first PPP negotiation parameter and a second PPP negotiation parameter, and to deliver a negotiation result to the forwarding plane device to create a data path between the forwarding plane device and the user equipment.

When the processing manner of the packet service processing protocol is PPP relay, step S302 may specifically be: Cause the control plane device to determine PPP relay as the processing manner of the packet service processing protocol according to the PDP Context, the subscription information, or the configuration information of the control plane device; step S304 may specifically be: Cause the control plane device to perform L2TP negotiation with an LNS server according to an L2TP negotiation parameter, and to deliver a negotiation result to the forwarding plane device to create an L2TP data path between the forwarding plane device and the LNS server, so that the user equipment and the LNS server can use the L2TP data path to perform PPP negotiation between the user equipment and the LNS server to create a data path between the user equipment and the LNS server. The forwarding plane device provides a forwarding function. For example, the forwarding plane device can encapsulate a PPP data packet received from the user equipment into an L2TP data packet according to the L2TP protocol, and send the data packet to the LNS server; and the forwarding plane device can also decapsulate the L2TP data packet received from the LNS server into a PPP data packet, and send the data packet to the user equipment.

When the processing manner of the packet service processing protocol is PPP regeneration, step S302 may specifically be: Cause the control plane device to determine PPP regeneration as the processing manner of the packet service processing protocol according to the PDP Context, the subscription information, or the configuration information of the control plane device; step S304 may specifically be: Cause the control plane device to perform L2TP negotiation with an LNS server according to an L2TP negotiation parameter, and to deliver a negotiation result to the forwarding plane device to create an L2TP data path between the forwarding plane device and the LNS server, so that the control plane device and the LNS server use the L2TP data path to perform PPP negotiation according to the first PPP negotiation parameter and the second PPP negotiation parameter, and deliver a negotiation result to the forwarding plane device. Optionally, the control plane device sends the IP address obtained in the PPP negotiation process to the user equipment, and creates a data path between the user equipment and the LNS server. The forwarding plane device provides a forwarding function. For example, the forwarding plane device can encapsulate an IP data packet received from the user equipment into a PPP data packet according to the PPP protocol, and then encapsulate the PPP data packet into an L2TP data packet according to the L2TP protocol, and send the data packet to the LNS server; and the forwarding plane device can also decapsulate the L2TP data packet received from the LNS server into a PPP data packet, and decapsulate the PPP data packet into an IP data packet according to the PPP protocol, and send the data packet to the user equipment.

The first PPP negotiation parameter and the second PPP negotiation parameter make up a complete PPP negotiation parameter. The first PPP negotiation parameter includes an IP address, a PPP authentication manner, a PPP authentication parameter, a PPP heartbeat cycle, and so on. The second PPP negotiation parameter includes an MRU, Protocol-Field-Compression, Address-and-Control-Field-Compression, IP-Compression-Protocol, and so on. The L2TP negotiation parameter includes an LNS address or address list, an L2TP authentication manner, an L2TP authentication address, an L2TP heartbeat cycle, and so on. The first PPP negotiation parameter and the L2TP negotiation parameter are negotiation parameters obtained by the control plane device from subscription information, local configuration of a gateway, or a DHCP server.

When the processing manner of the packet service processing protocol is PPP access or PPP regeneration, the negotiation parameter of the packet service processing protocol, which is obtained by the control plane device and configured by the forwarding plane device itself, may be the second PPP negotiation parameter. The L2TP negotiation parameter may also be directly configured onto the forwarding plane device through the gateway. Therefore, when the processing manner of the packet service processing protocol is PPP access or PPP regeneration, the negotiation parameter of the packet service processing protocol, which is obtained by the control plane device and configured by the forwarding plane device itself, may also be the second PPP negotiation parameter and the L2TP negotiation parameter.

Step S305: Cause the control plane device to receive data path release information uploaded by the forwarding plane device.

Step S306: Cause the control plane device to initiate a packet data protocol context release procedure according to the data path release information.

In an architecture with control decoupled from forwarding on a gateway, the forwarding plane device is responsible for forwarding data packet, and the control plane device is responsible for outbound signaling interaction. Therefore, the forwarding plane device needs to report the detected data path release information to the control plane device, and the control plane device performs a PDP Context release procedure to recycle resources. In the embodiment of the present invention, the data path release information includes PPP heartbeat exception information in the path, information about an LCP termination procedure initiated by the user equipment, L2TP heartbeat exception information in the data path, information about an L2TP session termination procedure initiated by the LNS, or information about an L2TP tunnel termination procedure initiated by the LNS. Parameters related to detection of the PPP heartbeat exception information or the L2TP heartbeat exception information, such as heartbeat cycle and Magic Number (loop detection), are delivered by the control plane device to the forwarding plane device.

In the embodiment of the present invention, the control plane device instructs the forwarding plane device to transparently transmit the negotiation packet of the packet service processing protocol to the control plane device, and obtains the negotiation parameter of the packet service processing protocol that is configured by the forwarding plane device itself; and the control plane device performs packet service processing protocol negotiation, and delivers a negotiation result to the forwarding plane device to create a data path between the user equipment and the network device. In this way, when control is decoupled from forwarding on the gateway, the control plane device can cooperate with the forwarding plane device to perform packet service processing protocol negotiation.

Figure 9:
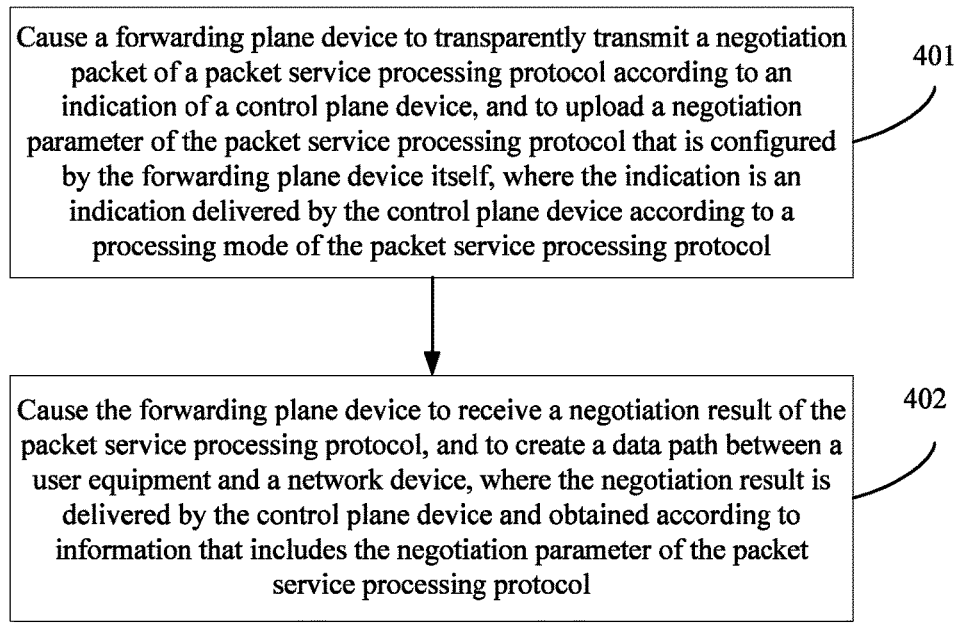
FIG. 9 is a flowchart of Embodiment 7 of a protocol processing method applied when control is decoupled from forwarding according to the present invention.

The present invention further provides an embodiment of a protocol processing method applied when control is decoupled from forwarding. FIG. 9 is a flowchart of Embodiment 7 of a protocol processing method applied when control is decoupled from forwarding according to the present invention. As shown in FIG. 9, the method includes the following steps.

Step 401: Cause a forwarding plane device to transparently transmit a negotiation packet of a packet service processing protocol according to an indication of a control plane device, and to upload a negotiation parameter of the packet service processing protocol that is configured by the forwarding plane device itself, where the indication is an indication delivered by the control plane device according to a processing manner of the packet service processing protocol.

The packet service processing protocol is a data transmission rule, and is primarily used to create a data path between networks or terminal devices. Before a data path is created between the networks or terminal devices, both parties need to negotiate according to the negotiation parameter of the packet service processing protocol, so that both parties determine how the opposite party handles data.

Step 402: Cause the forwarding plane device to receive a negotiation result of the packet service processing protocol, and to create a data path between a user equipment and a network device, where the negotiation result is delivered by the control plane device and obtained according to information that includes the negotiation parameter of the packet service processing protocol.

When control is decoupled from forwarding on a gateway, the forwarding plane device is responsible for forwarding data packet. After performing packet service processing protocol negotiation, the control plane device needs to deliver a negotiation result to the forwarding plane device, and subsequently the forwarding plane device is responsible for processing the data packet of the packet service processing protocol.

In the embodiment of the present invention, the forwarding plane device transparently transmits the negotiation packet of the packet service processing protocol to the control plane device, and uploads the negotiation parameter of the packet service processing protocol that is configured by the forwarding plane device itself; the control plane device performs packet service processing protocol negotiation; and the forwarding plane device receives a negotiation result that is delivered by the control plane device after completion of the packet service processing protocol negotiation, and creates a data path between the user equipment and the network device. In this way, when control is decoupled from forwarding on a gateway, the forwarding plane device can cooperate with the control plane device to perform packet service processing protocol negotiation.

Figure 10:
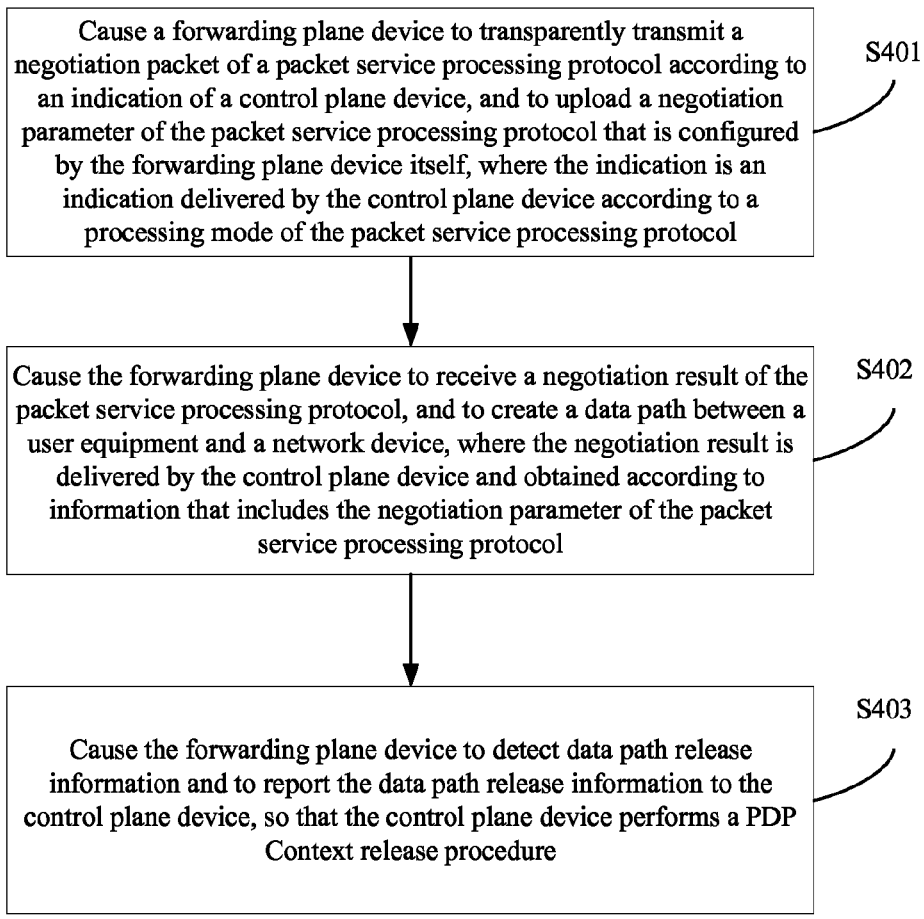
FIG. 10 is a flowchart of Embodiment 8 of a protocol processing method applied when control is decoupled from forwarding according to the present invention.

FIG. 10 is a flowchart of Embodiment 8 of a protocol processing method applied when control is decoupled from forwarding according to the present invention. As shown in FIG. 10, the method includes the following steps.

Step S401: Cause a forwarding plane device to transparently transmit a negotiation packet of a packet service processing protocol according to an indication of a control plane device, and to upload a negotiation parameter of the packet service processing protocol that is configured by the forwarding plane device itself, where the indication is an indication delivered by the control plane device according to a processing manner of the packet service processing protocol.

The packet service processing protocol is a data transmission rule, and is primarily used to create a data path between networks or terminal devices. Before a data path is created between the networks or terminal devices, both parties need to negotiate according to the negotiation parameter of the packet service processing protocol, so that both parties determine how the opposite party handles data.

Step S402: Cause the forwarding plane device to receive a negotiation result of the packet service processing protocol, and to create a data path between a user equipment and a network device, where the negotiation result is delivered by the control plane device and obtained according to information that includes the negotiation parameter of the packet service processing protocol.

In the embodiment of the present invention, the packet service processing protocols include a PPP, an L2TP, GRE, and so on, and the processing manners of the packet service processing protocol include PPP access, PPP relay, PPP regeneration, and so on.

When the processing manner of the packet service processing protocol is PPP access, the negotiation parameter of the packet service processing protocol, which is uploaded by the forwarding plane device, is a second PPP negotiation parameter. S402 may specifically be: Cause the forwarding plane device to receive a negotiation result and to create a data path between the user equipment and the forwarding plane device, where the negotiation result is delivered by the control plane device after PPP negotiation is performed with the user equipment according to the first PPP negotiation parameter and a second PPP negotiation parameter.

When the processing manner of the packet service processing protocol is PPP relay, S402 may specifically be: Cause the forwarding plane device to receive a negotiation result that is delivered by the control plane device after L2TP negotiation is performed with an LNS server according to an L2TP negotiation parameter, and to create an L2TP data path between the forwarding plane device and the LNS server, so that the user equipment and the LNS server can use the L2TP data path to perform PPP negotiation between the user equipment and the LNS server to create a data path between the user equipment and the LNS server. The forwarding plane device provides a forwarding function. For example, the forwarding plane device can encapsulate a PPP data packet received from the user equipment into an L2TP data packet according to the L2TP protocol, and send the data packet to the LNS server; and the forwarding plane device can also decapsulate the L2TP data packet received from the LNS server into a PPP data packet, and send the data packet to the user equipment.

When the processing manner of the packet service processing protocol is PPP regeneration, S402 may specifically be: Cause the forwarding plane device to receive a negotiation result that is delivered by the control plane device after L2TP negotiation is performed with an LNS server according to an L2TP negotiation parameter, and to create an L2TP data path between the forwarding plane device and the LNS server, so that the control plane device and the LNS server use the L2TP data path to perform PPP negotiation according to the first PPP negotiation parameter and the second PPP negotiation parameter and deliver a negotiation result.

Optionally, the control plane device sends the IP address obtained in the PPP negotiation process to the user equipment, and creates a data path between the user equipment and the LNS server. The forwarding plane device further provides a forwarding function. For example, the forwarding plane device can encapsulate an IP data packet received from the user equipment into a PPP data packet according to the PPP protocol, and then encapsulate the PPP data packet into an L2TP data packet according to the L2TP protocol, and send the data packet to the LNS server; and the forwarding plane device can also decapsulate the L2TP data packet received from the LNS server into a PPP data packet, and decapsulate the PPP data packet into an IP data packet according to the PPP protocol, and send the data packet to the user equipment.

The first PPP negotiation parameter and the second PPP negotiation parameter make up a complete PPP negotiation parameter. The first PPP negotiation parameter includes an IP address, a PPP authentication manner, a PPP authentication parameter, a PPP heartbeat cycle, and so on. The second PPP negotiation parameter includes an MRU, Protocol-Field-Compression, Address-and-Control-Field-Compression, IP-Compression-Protocol, and so on. The L2TP negotiation parameter includes an LNS address or address list, an L2TP authentication manner, an L2TP authentication address, an L2TP heartbeat cycle, and so on. The first PPP negotiation parameter and the L2TP negotiation parameter are negotiation parameters obtained by the control plane device from subscription information, local configuration of a gateway, or a DHCP server.

When the processing manner of the packet service processing protocol is PPP access or PPP regeneration, the negotiation parameter of the packet service processing protocol, which is uploaded by the forwarding plane device, may be the second PPP negotiation parameter. The L2TP negotiation parameter may also be directly configured onto the forwarding plane device through the gateway. Therefore, when the processing manner of the packet service processing protocol is PPP access or PPP regeneration, the negotiation parameter of the packet service processing protocol, which is uploaded by the forwarding plane device, may also be the second PPP negotiation parameter and the L2TP negotiation parameter.

Step S403: Cause the forwarding plane device to detect data path release information and to report the data path release information to the control plane device, so that the control plane device performs a PDP Context release procedure.

In the embodiment of the present invention, the data path release information includes PPP heartbeat exception information in the path, information about an LCP termination procedure initiated by the user equipment, L2TP heartbeat exception information in the data path, information about an L2TP session termination procedure initiated by the LNS, or information about an L2TP tunnel termination procedure initiated by the LNS. Parameters related to detection of the PPP heartbeat exception or the L2TP heartbeat exception, such as heartbeat cycle and Magic Number (loop detection), are delivered by the control plane device to the forwarding plane device.

In the embodiment of the present invention, the forwarding plane device transparently transmits the negotiation packet of the packet service processing protocol to the control plane device, and uploads the negotiation parameter of the packet service processing protocol to the control plane device, where the negotiation parameter is configured by the forwarding plane device itself; the control plane device performs packet service processing protocol negotiation; and the forwarding plane device receives a negotiation result that is delivered by the control plane device after completion of the packet service processing protocol negotiation, and creates a data path between the user equipment and the network device. In this way, when control is decoupled from forwarding on a gateway, the forwarding plane device can cooperate with the control plane device to perform packet service processing protocol negotiation.

Figure 11:
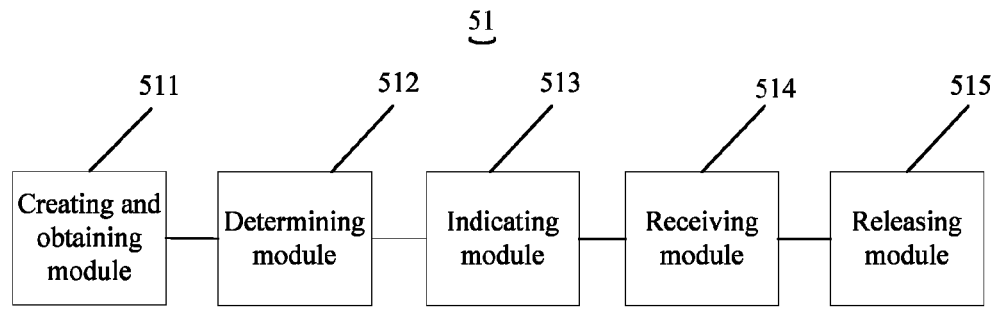
FIG. 11 is schematic structural diagram of Embodiment 1 of a control plane device according to the present invention.

The present invention further provides an embodiment of a control plane device. FIG. 11 is schematic structural diagram of Embodiment 1 of a control plane device according to the present invention. As shown in FIG. 11, the control plane device 51 includes an indicating module 513 and a receiving module 514.

The indicating module 513 sends an indication to a forwarding plane device according to a processing manner of a packet service processing protocol, and delivers a negotiation parameter of the packet service processing protocol to the forwarding plane device. The packet service processing protocol is a data transmission rule, and is primarily used to create a data path between networks or terminal devices. Before a data path is created between the networks or terminal devices, both parties need to negotiate according to the negotiation parameter of the packet service processing protocol, so that both parties determine how the opposite party handles data. The receiving module 514 receives a negotiation result of the packet service processing protocol, and creates a data path between a user equipment and a network device, where the negotiation result is uploaded by the forwarding plane device and obtained according to information that includes the negotiation parameter of the packet service processing protocol.

In the embodiment of the present invention, the packet service processing protocol may be a PPP, an L2TP, GRE, and so on. The processing manner of the packet service processing protocol may be PPP access, PPP relay, PPP regeneration, and so on.

When the processing manner of the packet service processing protocol is PPP access, the indicating module 513 is specifically configured to send an indication to the forwarding plane device according to the PPP access and deliver a first PPP negotiation parameter to the forwarding plane device; and the receiving module 514 is specifically configured to receive a negotiation result and create a data path between the forwarding plane device and the user equipment, where the negotiation result is uploaded by the forwarding plane device after PPP negotiation is performed with the user equipment according to the first PPP negotiation parameter and a second PPP negotiation parameter that is configured by the forwarding plane device itself.

When the processing manner of the packet service processing protocol is PPP relay, the receiving module 514 is specifically configured to receive a negotiation result, and create a data path between the user equipment and the LNS server, where the forwarding plane device performs L2TP negotiation with an LNS server according to an L2TP negotiation parameter, and creates an L2TP data path between the forwarding plane device and the LNS server, and the forwarding plane device provides a LAC function according to the first PPP negotiation parameter and the second PPP negotiation parameter, so that the user equipment can perform PPP negotiation with the LNS server by using the L2TP data path and the forwarding plane device reports the negotiation result. The providing, by the forwarding plane device, a LAC function according to the first PPP negotiation parameter and the second PPP negotiation parameter includes: encapsulating, by the forwarding plane device, a PPP data packet received from the user equipment into an L2TP data packet according to the L2TP protocol, and sending the data packet to the LNS server; and, decapsulating, by the forwarding plane device, the L2TP data packet received from the LNS server into a PPP data packet, and sending the data packet to the user equipment.

When the processing manner of the packet service processing protocol is PPP regeneration, the receiving module 514 is specifically configured to: receive a negotiation result, and create a data path between the user equipment and the LNS server, where the forwarding plane device performs L2TP negotiation with an LNS server according to an L2TP negotiation parameter, and creates an L2TP data path between the forwarding plane device and the LNS server, so that the forwarding plane device perform PPP negotiation with the LNS server by using the L2TP data path according to the first PPP negotiation parameter and the second PPP negotiation parameter that is configured by the forwarding plane device itself, and reports the negotiation result. Optionally, the control plane device sends the IP address obtained in the PPP negotiation process to the user equipment, and the forwarding plane device provides a LAC function according to the first PPP negotiation parameter and the second PPP negotiation parameter. The providing, by the forwarding plane device, a LAC function according to the first PPP negotiation parameter and the second PPP negotiation parameter includes: encapsulating, by the forwarding plane device, an IP data packet received from the user equipment into a PPP data packet according to the PPP protocol, and then encapsulating the PPP data packet into an L2TP data packet according to the L2TP protocol, and sending the data packet to the LNS server; and, decapsulating, by the forwarding plane device, the L2TP data packet received from the LNS server into a PPP data packet, and decapsulating the PPP data packet into an IP data packet according to the PPP protocol, and sending the data packet to the user equipment.

The first PPP negotiation parameter and the second PPP negotiation parameter make up a complete PPP negotiation parameter. The first PPP negotiation parameter includes an IP address, a PPP authentication manner, a PPP authentication parameter, a PPP heartbeat cycle, and so on. The second PPP negotiation parameter includes an MRU, Protocol-Field-Compression, Address-and-Control-Field-Compression, IP-Compression-Protocol, and so on. The L2TP negotiation parameter includes an LNS address or address list, an L2TP authentication manner, an L2TP authentication address, an L2TP heartbeat cycle, and so on. The first PPP negotiation parameter and the L2TP negotiation parameter may be negotiation parameters obtained by the control plane device from subscription information, local configuration of a gateway, or a DHCP server. When the processing manner of the packet service processing protocol is PPP access or PPP regeneration, the negotiation parameter of the packet service processing protocol, which is delivered by the indicating module 513 to the forwarding plane device, may be the first PPP negotiation parameter and the L2TP negotiation parameter, where the L2TP negotiation parameter may be directly configured onto the forwarding plane device through a gateway. Therefore, when the processing manner of the packet service processing protocol is PPP relay or PPP regeneration, the negotiation parameter of the packet service processing protocol, which is delivered by the indicating module 513 to the forwarding plane device, may also be a first PPP negotiation parameter only.

The control plane device 51 further includes a creating and obtaining module 511, a determining module 512, and a releasing module 515. When the user equipment needs to use higher layer service after the user equipment gets attached to a mobile communication network, the user equipment initiates a PDP Context creation request, where the PDP Context includes information such as a user equipment identifier. The creating and obtaining module 511 receives the request, and creates a PDP Context with the user equipment, and obtains subscription information from the AAA server. The AAA server stores the processing manner of the packet service processing protocol that allows the user equipment to access an external network, and the processing manner of the packet service processing protocol that allows the user equipment to access an external network may also be configured in the control plane device directly. The determining module 512 determines the processing manner of the packet service processing protocol according to the PDP Context, the subscription information, or the configuration information of the control plane device 51 itself. The indicating module 513 and the receiving module 514 create a data path between the user equipment and the network device. The releasing module 515 receives the data path release information uploaded by the forwarding plane device, and initiates a PDP Context release procedure. In the embodiment of the present invention, the data path release information includes PPP heartbeat exception information, information about an LCP termination procedure initiated by the user equipment, L2TP heartbeat exception information, information about an L2TP session termination procedure initiated by the LNS, or information about an L2TP tunnel termination procedure initiated by the LNS.

In the embodiment of the present invention, the indicating module sends an indication to the forwarding plane device according to the processing manner of the packet service processing protocol, and delivers a negotiation parameter of the packet service processing protocol to the forwarding plane device; the forwarding plane device performs packet service processing protocol negotiation; and the receiving module receives a negotiation result that is uploaded by the forwarding plane device after completion of the negotiation, and creates a data path between the user equipment and the network device. In this way, when control is decoupled from forwarding on a gateway, the forwarding plane device can cooperate with the control plane device to perform packet service processing protocol negotiation.

Figure 12:
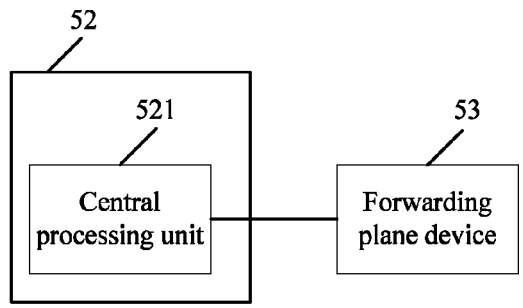
FIG. 12 is schematic structural diagram of Embodiment 2 of a control plane device according to the present invention.

The present invention further provides an embodiment of a control plane device. As shown in FIG. 12, the control plane device 52 includes a central processing unit 521. The central processing unit 521 is configured to send an indication to a forwarding plane device 53 according to a processing manner of a packet service processing protocol, deliver a negotiation parameter of the packet service processing protocol to the forwarding plane device 53, and receive a negotiation result of the packet service processing protocol and create a data path between a user equipment and a network device, where the negotiation result is uploaded by the forwarding plane device 53 and obtained according to information that includes the negotiation parameter of the packet service processing protocol.

In the embodiment of the present invention, the central processing unit of the control plane device sends an indication to the forwarding plane device according to the processing manner of the packet service processing protocol, and delivers a negotiation parameter of the packet service processing protocol to the forwarding plane device; the forwarding plane device performs packet service processing protocol negotiation, and receives a negotiation result that is uploaded by the forwarding plane device after completion of the negotiation, and creates a data path between the user equipment and the network device. In this way, when control is decoupled from forwarding on a gateway, the forwarding plane device can cooperate with the control plane device to perform packet service processing protocol negotiation.

Figure 13:
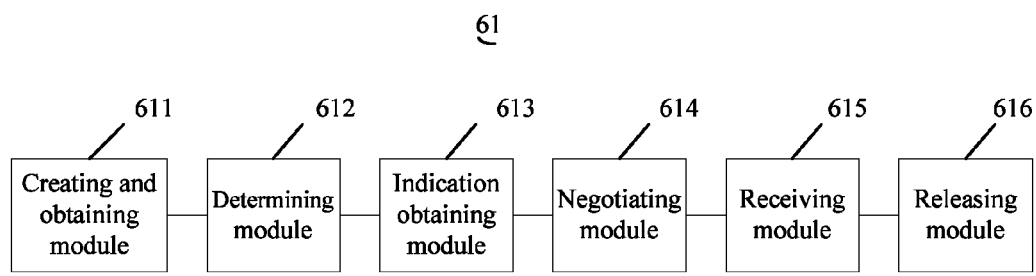
FIG. 13 is schematic structural diagram of Embodiment 3 of a control plane device according to the present invention.

The present invention further provides an embodiment of a control plane device. As shown in FIG. 13, the control plane device 61 includes an indication obtaining module 613 and a negotiating module 614.

The indication obtaining module 613 obtains a negotiation parameter of a packet service processing protocol that is configured by a forwarding plane device itself, and instructs the forwarding plane device to transparently transmit a negotiation packet of the packet service processing protocol to the control plane device.

The negotiating module 614 performs packet service processing protocol negotiation according to information that includes the negotiation parameter of the packet service processing protocol, and delivers a negotiation result to the forwarding plane device to create a data path between a user equipment and a network device. The packet service processing protocol is a data transmission rule, and is primarily used to create a data path between networks or terminal devices. Before a data path is created between the networks or terminal devices, both parties need to negotiate according to the negotiation parameter of the packet service processing protocol, so that both parties determine how the opposite party handles data.

In the embodiment of the present invention, the packet service processing protocol may be a PPP, an L2TP, GRE, and so on. The processing manner of the packet service processing protocol may be PPP access, PPP relay, PPP regeneration, and so on.

When the processing manner of the packet service processing protocol is PPP access, the negotiating module 614 is specifically configured to perform PPP negotiation with the user equipment according to a second PPP negotiation parameter and a first PPP negotiation parameter, and deliver a negotiation result to the forwarding plane device to create a data path between the forwarding plane device and the user equipment. The second PPP negotiation parameter is a negotiation parameter of the packet service processing protocol that is obtained by the indication obtaining module 613 and configured by the forwarding plane device itself, and the first PPP negotiation parameter is a negotiation parameter obtained by the control plane device 61 from subscription information, local configuration of a gateway, or a DHCP server.

When the processing manner of the packet service processing protocol is PPP relay, the negotiating module 614 is specifically configured to: perform L2TP negotiation with an LNS server according to an L2TP negotiation parameter, and deliver a negotiation result to the forwarding plane device to create an L2TP data path between the forwarding plane device and the LNS server, so that the user equipment and the LNS server can use the L2TP data path to perform PPP negotiation between the user equipment and the LNS server to create a data path between the user equipment and the LNS server. The forwarding plane device provides a forwarding function. For example, the forwarding plane device can encapsulate a PPP data packet received from the user equipment into an L2TP data packet according to the L2TP protocol, and send the data packet to the LNS server; and the forwarding plane device can also decapsulate the L2TP data packet received from the LNS server into a PPP data packet, and send the data packet to the user equipment.

When the processing manner of the packet service processing protocol is PPP regeneration, the negotiating module 614 is specifically configured to: perform L2TP negotiation with an LNS server according to an L2TP negotiation parameter, deliver a negotiation result to the forwarding plane device, and create an L2TP data path between the forwarding plane device and the LNS server, so that the control plane device and the LNS server use the L2TP data path to perform PPP negotiation according to the second PPP negotiation parameter and the first PPP negotiation parameter and deliver a negotiation result to the forwarding plane device. Optionally, the control plane device sends the IP address obtained in the PPP negotiation process to the user equipment, and creates a data path between the user equipment and the LNS server. The forwarding plane device provides a forwarding function. For example, the forwarding plane device can encapsulate an IP data packet received from the user equipment into a PPP data packet according to the PPP protocol, and then encapsulate the PPP data packet into an L2TP data packet according to the L2TP protocol, and send the data packet to the LNS server; and the forwarding plane device can also decapsulate the L2TP data packet received from the LNS server into a PPP data packet, and decapsulate the PPP data packet into an IP data packet according to the PPP protocol, and send the data packet to the user equipment.

The first PPP negotiation parameter and the second PPP negotiation parameter make up a complete PPP negotiation parameter. The first PPP negotiation parameter includes an IP address, a PPP authentication manner, a PPP authentication parameter, a PPP heartbeat cycle, and so on. The second PPP negotiation parameter includes an MRU, Protocol-Field-Compression, Address-and-Control-Field-Compression, IP-Compression-Protocol, and so on. The L2TP negotiation parameter includes an LNS address or address list, an L2TP authentication manner, an L2TP authentication address, an L2TP heartbeat cycle, and so on. The first PPP negotiation parameter and the L2TP negotiation parameter may be negotiation parameters obtained by the control plane device 61 from subscription information, local configuration of a gateway, or a DHCP server. When the processing manner of the packet service processing protocol is PPP access or PPP regeneration, the negotiation parameter of the packet service processing protocol, which is obtained by the indication obtaining module 613 and configured by the forwarding plane device itself, may be the second PPP negotiation parameter. The L2TP negotiation parameter may also be directly configured onto the forwarding plane device through the gateway. Therefore, when the processing manner of the packet service processing protocol is PPP relay or PPP regeneration, the negotiation parameter of the packet service processing protocol, which is obtained by the indication obtaining module 613 and configured by the forwarding plane device itself, may also be the second PPP negotiation parameter and the L2TP negotiation parameter.

The control plane device 61 further includes a creating and obtaining module 611, a determining module 612, a receiving module 615, and a releasing module 616. When the user equipment needs to use higher layer service after the user equipment gets attached to a mobile communication network, the user equipment sends a PDP Context creation request, where the PDP Context includes information such as a user equipment identifier. The creating and obtaining module 611 receives the request, and creates a PDP Context with the user equipment, and obtains subscription information from the AAA server. The AAA server stores the processing manner of the packet service processing protocol that allows the user equipment to access an external network, and the processing manner of the packet service processing protocol that allows the user equipment to access an external network may also be configured in the control plane device. The determining module 612 determines the processing manner of the packet service processing protocol according to the PDP Context, the subscription information, or the configuration information of the control plane device 61 itself. The indication obtaining module 613 and the negotiating module 614 create a data path between the user equipment and the network device. The receiving module 615 receives the data path release information uploaded by the forwarding plane device, and the releasing module 616 initiates a PDP Context release procedure according to the data path release information. In the embodiment of the present invention, the data path release information includes PPP heartbeat exception information, information about an LCP termination procedure initiated by the user equipment, L2TP heartbeat exception information, information about an L2TP session termination procedure initiated by the LNS, or information about an L2TP tunnel termination procedure initiated by the LNS. Parameters related to detection of the PPP heartbeat exception or the L2TP heartbeat exception, such as heartbeat cycle and Magic Number (loop detection), are delivered by the control plane device to the forwarding plane device.

In the embodiment of the present invention, the indication obtaining module instructs the forwarding plane device to transparently transmit the negotiation packet of the packet service processing protocol to the control plane device, and obtains the negotiation parameter of the packet service processing protocol that is configured by the forwarding plane device itself; and the negotiating module performs packet service processing protocol negotiation according to information that includes the negotiation parameter of the packet service processing protocol, and delivers a negotiation result to the forwarding plane device to create a data path between the user equipment and the network device. In this way, when control is decoupled from forwarding on the gateway, the control plane device can cooperate with the forwarding plane device to perform packet service processing protocol negotiation.

Figure 14:
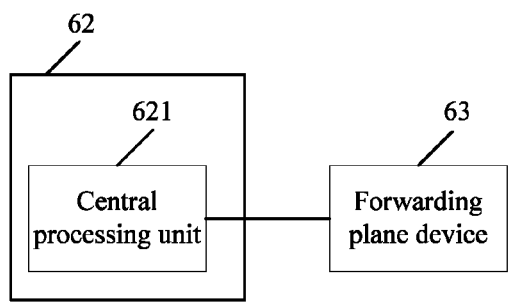
FIG. 14 is schematic structural diagram of Embodiment 4 of a control plane device according to the present invention.

The present invention further provides an embodiment of a forwarding plane device. As shown in FIG. 14, the control plane device 62 includes a central processing unit 621. The central processing unit 621 is configured to obtain a negotiation parameter of a packet service processing protocol that is configured by a forwarding plane device 63 itself, and instruct the forwarding plane device 63 to transparently transmit a negotiation packet of the packet service processing protocol to the control plane device 62, and the central processing unit 621 performs negotiation according to information that includes the negotiation parameter of the packet service processing protocol, and delivers a negotiation result to the forwarding plane device 63 to create a data path between a user equipment and a network device.

In the embodiment of the present invention, the central processing unit of the forwarding plane device instructs the forwarding plane device to transparently transmit the negotiation packet of the packet service processing protocol to the control plane device, and obtains the negotiation parameter of the packet service processing protocol that is configured by the forwarding plane device itself; and the central processing unit performs packet service processing protocol negotiation according to information that includes the negotiation parameter of the packet service processing protocol, and delivers a negotiation result to the forwarding plane device to create a data path between the user equipment and the network device. In this way, when control is decoupled from forwarding on the gateway, the control plane device can cooperate with the forwarding plane device to perform packet service processing protocol negotiation.

Figure 15:
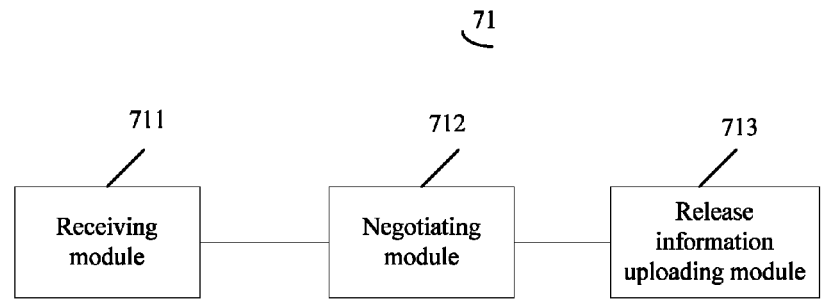
FIG. 15 is schematic structural diagram of Embodiment 1 of a forwarding plane device according to the present invention.

The present invention further provides an embodiment of a forwarding plane device. As shown in FIG. 15, the forwarding plane device 71 includes a receiving module 711 and a negotiating module 712.

The receiving module 711 receives a negotiation parameter of a packet service processing protocol and an indication of a processing manner of the packet service processing protocol that are delivered by a control plane device. The negotiating module 712 performs negotiation according to the indication and with reference to information that includes the negotiation parameter of the packet service processing protocol, and reports a negotiation result to the control plane device to create a data path between a user equipment and a network device. A packet service processing protocol is a data transmission rule, and is primarily used to create a data path between networks or terminal devices. Before a data path is created between the networks or terminal devices, both parties need to negotiate according to the negotiation parameter of the packet service processing protocol, so that both parties determine how the opposite party handles data.

In the embodiment of the present invention, the packet service processing protocol may be a PPP, an L2TP, GRE, and so on. The processing manners of the packet service processing protocol include PPP access, PPP relay, PPP regeneration, and so on.

When the processing manner of the packet service processing protocol is PPP access, the receiving module 711 is specifically configured to: receive a first PPP negotiation parameter and a PPP access indication that are delivered by the control plane device; and the negotiating module 712 is specifically configured to: perform PPP negotiation with the user equipment according to the first PPP negotiation parameter and a second PPP negotiation parameter that is configured by the forwarding plane device 71 itself, and report a negotiation result to the control plane device to create a data path between the user equipment and the forwarding plane device.

When the processing manner of the packet service processing protocol is PPP relay, the negotiating module 712 is specifically configured to perform L2TP negotiation with an LNS server according to an L2TP negotiation parameter, and create an L2TP data path between the forwarding plane device and the LNS server, where the forwarding plane device provides a LAC function according to the first PPP negotiation parameter and the second PPP negotiation parameter, so that the user equipment and the LNS server can use the L2TP data path to perform PPP negotiation and report a negotiation result to the control plane device to create a data path between the user equipment and the LNS server. The providing, by the forwarding plane device, a LAC function according to the first PPP negotiation parameter and the second PPP negotiation parameter includes: encapsulating, by the forwarding plane device, a PPP data packet received from the user equipment into an L2TP data packet according to the L2TP protocol, and sending the data packet to the LNS server; and, decapsulating, by the forwarding plane device, the L2TP data packet received from the LNS server into a PPP data packet, and sending the data packet to the user equipment.

When the processing manner of the packet service processing protocol is PPP regeneration, the negotiating module 712 is specifically configured to: perform L2TP negotiation with an LNS server according to an L2TP negotiation parameter, and create an L2TP data path between the forwarding plane device and the LNS server, so that the forwarding plane device and the LNS server use the L2TP data path to perform PPP negotiation according to the first PPP negotiation parameter and the second PPP negotiation parameter that is configured by the forwarding plane device 71 itself, and report a negotiation result to the control plane device. The forwarding plane device provides a LAC function according to the first PPP negotiation parameter and the second PPP negotiation parameter, and creates a data path between the user equipment and the LNS server. The providing, by the forwarding plane device, a LAC function according to the first PPP negotiation parameter and the second PPP negotiation parameter includes: encapsulating, by the forwarding plane device, an IP data packet received from the user equipment into a PPP data packet according to the PPP protocol, and then encapsulating the PPP data packet into an L2TP data packet according to the L2TP protocol, and sending the data packet to the LNS server; and, decapsulating, by the forwarding plane device, the L2TP data packet received from the LNS server into a PPP data packet, and decapsulating the PPP data packet into an IP data packet according to the PPP protocol, and sending the data packet to the user equipment.

The first PPP negotiation parameter and the second PPP negotiation parameter make up a complete PPP negotiation parameter. The first PPP negotiation parameter includes an IP address, a PPP authentication manner, a PPP authentication parameter, a PPP heartbeat cycle, and so on. The L2TP negotiation parameter includes an LNS address or address list, an L2TP authentication manner, an L2TP authentication address, an L2TP heartbeat cycle, and so on. The second PPP negotiation parameter includes an MRU, Protocol-Field-Compression, Address-and-Control-Field-Compression, IP-Compression-Protocol, and so on. The first PPP negotiation parameter and the L2TP negotiation parameter are negotiation parameters obtained by the control plane device from subscription information, local configuration of a gateway, or a DHCP server. When the processing manner of the packet service processing protocol is PPP access or PPP regeneration, the negotiation parameter of the packet service processing protocol, which is received by the receiving module 711 and delivered by the control plane device, may be the first PPP negotiation parameter and the L2TP negotiation parameter. The L2TP negotiation parameter may also be directly configured onto the forwarding plane device through the gateway. Therefore, when the processing manner of the packet service processing protocol is PPP regeneration and PPP relay, the negotiation parameter of the packet service processing protocol, which is received by the receiving module 711 and delivered by the control plane device, may also be the first PPP negotiation parameter only.

The forwarding plane device 71 further includes a release information uploading module 713. The release information uploading module 713 detects L2TP heartbeat exception information, information about an L2TP session termination procedure initiated by the LNS, information about an L2TP data path termination procedure initiated by the LNS, PPP heartbeat exception information, or information about an LCP termination procedure initiated by the user equipment, and reports the detected information as data path release information to the control plane device, and the control plane device initiates a PDP Context release procedure.

In the embodiment of the present invention, the receiving module receives a negotiation parameter of the packet service processing protocol and an indication of a processing manner of the packet service processing protocol that are delivered by the control plane device, and the negotiating module performs packet service processing protocol negotiation according to the indication and with reference to information that includes the negotiation parameter of the packet service processing protocol, and reports a negotiation result to the control plane device to create a data path between the user equipment and the network device. In this way, when control is decoupled from forwarding on the gateway, the control plane device can cooperate with the forwarding plane device to perform packet service processing protocol negotiation.

Figure 16:
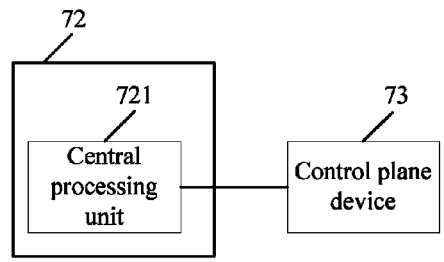
FIG. 16 is schematic structural diagram of Embodiment 2 of a forwarding plane device according to the present invention.

The present invention further provides an embodiment of a forwarding plane device. As shown in FIG. 16, the forwarding plane device 72 includes a central processing unit 721. The central processing unit 721 is configured to receive an indication of a processing manner of a packet service processing protocol and a negotiation parameter of the packet service processing protocol that are delivered by the control plane device 73, perform negotiation according to the indication and with reference to information that includes the negotiation parameter of the packet service processing protocol, and report a negotiation result to the control plane device 73 to create a data path between the user equipment and the network device.

In the embodiment of the present invention, the central processing unit of the forwarding plane device receives a negotiation parameter of the packet service processing protocol and an indication of a processing manner of the packet service processing protocol that are delivered by the control plane device, performs packet service processing protocol negotiation according to the indication and with reference to information that includes the negotiation parameter of the packet service processing protocol, and reports a negotiation result to the control plane device to create a data path between the user equipment and the network device. In this way, when control is decoupled from forwarding on the gateway, the control plane device can cooperate with the forwarding plane device to perform packet service processing protocol negotiation.

Figure 17:
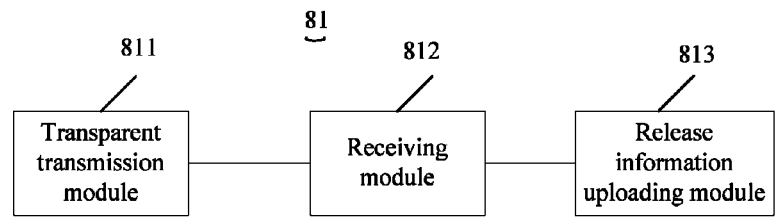
FIG. 17 is schematic structural diagram of Embodiment 3 of a forwarding plane device according to the present invention.

The present invention further provides a forwarding plane device. As shown in FIG. 17, the forwarding plane device 81 includes a transparent transmission module 811 and a receiving module 812.

The transparent transmission module 811 transparently transmits a negotiation packet of a packet service processing protocol according to an indication delivered by the control plane device to indicate a processing manner of the packet service processing protocol, and uploads a negotiation parameter of the packet service processing protocol, where the negotiation parameter is configured by the forwarding plane device itself. The packet service processing protocol is a data transmission rule, and is primarily used to create a data path between networks or terminal devices. Before a data path is created between the networks or terminal devices, both parties need to negotiate according to the negotiation parameter of the packet service processing protocol, so that both parties determine how the opposite party handles data. The receiving module 812 receives a negotiation result of the packet service processing protocol, and creates a data path between a user equipment and a network device, where the negotiation result is delivered by the control plane device and obtained according to information that includes the negotiation parameter of the packet service processing protocol.

In the embodiment of the present invention, the packet service processing protocol may be a PPP, an L2TP, GRE, and so on. The processing manner of the packet service processing protocol may be PPP access, PPP relay, PPP regeneration, and so on.

When the processing manner of the packet service processing protocol is PPP access, the receiving module 812 is specifically configured to receive a negotiation result and create a data path between the user equipment and the forwarding plane device, where the negotiation result is delivered by the control plane device after PPP negotiation is performed with the user equipment according to the first PPP negotiation parameter and a second PPP negotiation parameter. The second PPP negotiation parameter is a negotiation parameter of the packet service processing negotiation parameter that is uploaded by the transparent transmission module 811 and configured by the forwarding plane device 81 itself, and the first PPP negotiation parameter is a negotiation parameter obtained by the control plane device from subscription information, local configuration of a gateway, or a DHCP server.

When the processing manner of the packet service processing protocol is PPP relay, the receiving module 812 is specifically configured to receive a negotiation result that is delivered by the control plane device after L2TP negotiation is performed with an LNS server according to an L2TP negotiation parameter, and create an L2TP data path between the forwarding plane device and the LNS server, so that the user equipment and the LNS server can use the L2TP data path to perform PPP negotiation to create a data path between the user equipment and the LNS server. The forwarding plane device provides a forwarding function. For example, the forwarding plane device can encapsulate a PPP data packet received from the user equipment into an L2TP data packet according to the L2TP protocol, and send the data packet to the LNS server; and the forwarding plane device can also decapsulate the L2TP data packet received from the LNS server into a PPP data packet, and send the data packet to the user equipment.

When the processing manner of the packet service processing protocol is PPP regeneration, the receiving module 812 is specifically configured to receive a negotiation result that is delivered by the control plane device after L2TP negotiation is performed with an LNS server according to an L2TP negotiation parameter, and create an L2TP data path between the forwarding plane device and the LNS server, so that the control plane device and the LNS server use the L2TP data path to perform PPP negotiation according to the first PPP negotiation parameter and the second PPP negotiation parameter and then upload a negotiation result to create a data path between the user equipment and the LNS server. The forwarding plane device provides a forwarding function. For example, the forwarding plane device can encapsulate an IP data packet received from the user equipment into a PPP data packet according to the PPP protocol, and then encapsulate the PPP data packet into an L2TP data packet according to the L2TP protocol, and send the data packet to the LNS server; and the forwarding plane device can also decapsulate the L2TP data packet received from the LNS server into a PPP data packet, and decapsulate the PPP data packet into an IP data packet according to the PPP protocol, and send the data packet to the user equipment.

The first PPP negotiation parameter and the second PPP negotiation parameter make up a complete PPP negotiation parameter. The first PPP negotiation parameter includes an IP address, a PPP authentication manner, a PPP authentication parameter, a PPP heartbeat cycle, and so on. The L2TP negotiation parameter includes an LNS address or address list, an L2TP authentication manner, an L2TP authentication address, an L2TP heartbeat cycle, and so on. The first PPP negotiation parameter and the L2TP negotiation parameter are negotiation parameters obtained by the control plane device from subscription information, local configuration of a gateway, or a DHCP server.

When the processing manner of the packet service processing protocol is PPP access or PPP regeneration, the negotiation parameter of the packet service processing protocol, which is uploaded by the transparent transmission module 811 and configured by the forwarding plane device 81 itself, may be the second PPP negotiation parameter, where the L2TP negotiation parameter may also be configured onto the forwarding plane device directly through a gateway, and therefore, when the processing manner of the packet service processing protocol is PPP relay or PPP regeneration, the negotiation parameter of the packet service processing protocol, which is uploaded by the transparent transmission module 811 and configured by the forwarding plane device 81 itself, may also be the second PPP negotiation parameter and the L2TP negotiation parameter.

The forwarding plane device 81 further includes a release information uploading module 813. The release information uploading module 813 uploads detected data path release information to the control plane device, so that the control plane device performs a PDP Context release procedure. In the embodiment of the present invention, the data path release information includes PPP heartbeat exception information in the path, information about an LCP termination procedure initiated by the user equipment, L2TP heartbeat exception information in the data path, information about an L2TP session termination procedure initiated by the LNS, or information about an L2TP tunnel termination procedure initiated by the LNS. Parameters related to detection of the PPP heartbeat exception or the L2TP heartbeat exception, such as heartbeat cycle and Magic Number (loop detection), are delivered by the control plane device to the forwarding plane device.

In the embodiment of the present invention, the transparent transmission module transparently transmits the negotiation packet of the packet service processing protocol to the control plane device, and uploads the negotiation parameter of the packet service processing protocol to the control plane device, where the negotiation parameter is configured by the forwarding plane device itself; the control plane device performs packet service processing protocol negotiation; and the receiving module receives a negotiation result that is delivered by the control plane device after completion of the packet service processing protocol negotiation, and creates a data path between the user equipment and the network device. In this way, when control is decoupled from forwarding on a gateway, the forwarding plane device can cooperate with the control plane device to perform packet service processing protocol negotiation.

Figure 18:
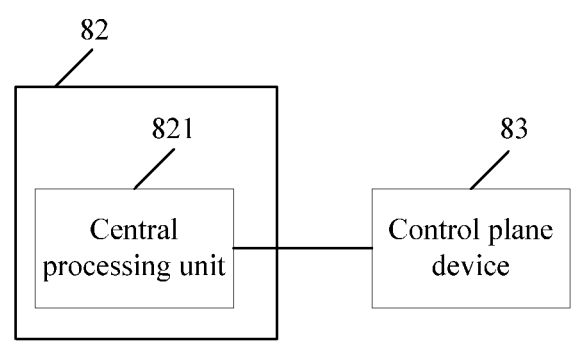
FIG. 18 is schematic structural diagram of Embodiment 4 of a forwarding plane device according to the present invention.

The present invention further provides an embodiment of a forwarding plane device. As shown in FIG. 18, the forwarding plane device 82 includes a central processing unit 821. The central processing unit 821 is configured to transparently transmit a negotiation packet of a packet service processing protocol to a control plane device 83 according to an indication of the control plane device 83, upload a negotiation parameter of the packet service processing protocol to the control plane device 83, where the negotiation parameter is configured by the central processing unit itself, and the indication is an indication delivered by the control plane device 83 according to a processing manner of the packet service processing protocol, and the central processing unit 821 receives a negotiation result of the packet service processing protocol and creates a data path between a user equipment and a network device, where the negotiation result is delivered by the control plane device 83 and obtained according to information that includes the negotiation parameter of the packet service processing protocol.

In the embodiment of the present invention, the central processing unit of the forwarding plane device transparently transmits the negotiation packet of the packet service processing protocol to the control plane device, and uploads the negotiation parameter of the packet service processing protocol to the control plane device, where the negotiation parameter is configured by the forwarding plane device itself; the control plane device performs packet service processing protocol negotiation; and the central processing unit receives a negotiation result that is delivered by the control plane device after completion of the packet service processing protocol negotiation, and creates a data path between the user equipment and the network device. In this way, when control is decoupled from forwarding on a gateway, the forwarding plane device can cooperate with the control plane device to perform packet service processing protocol negotiation.

Figure 19:
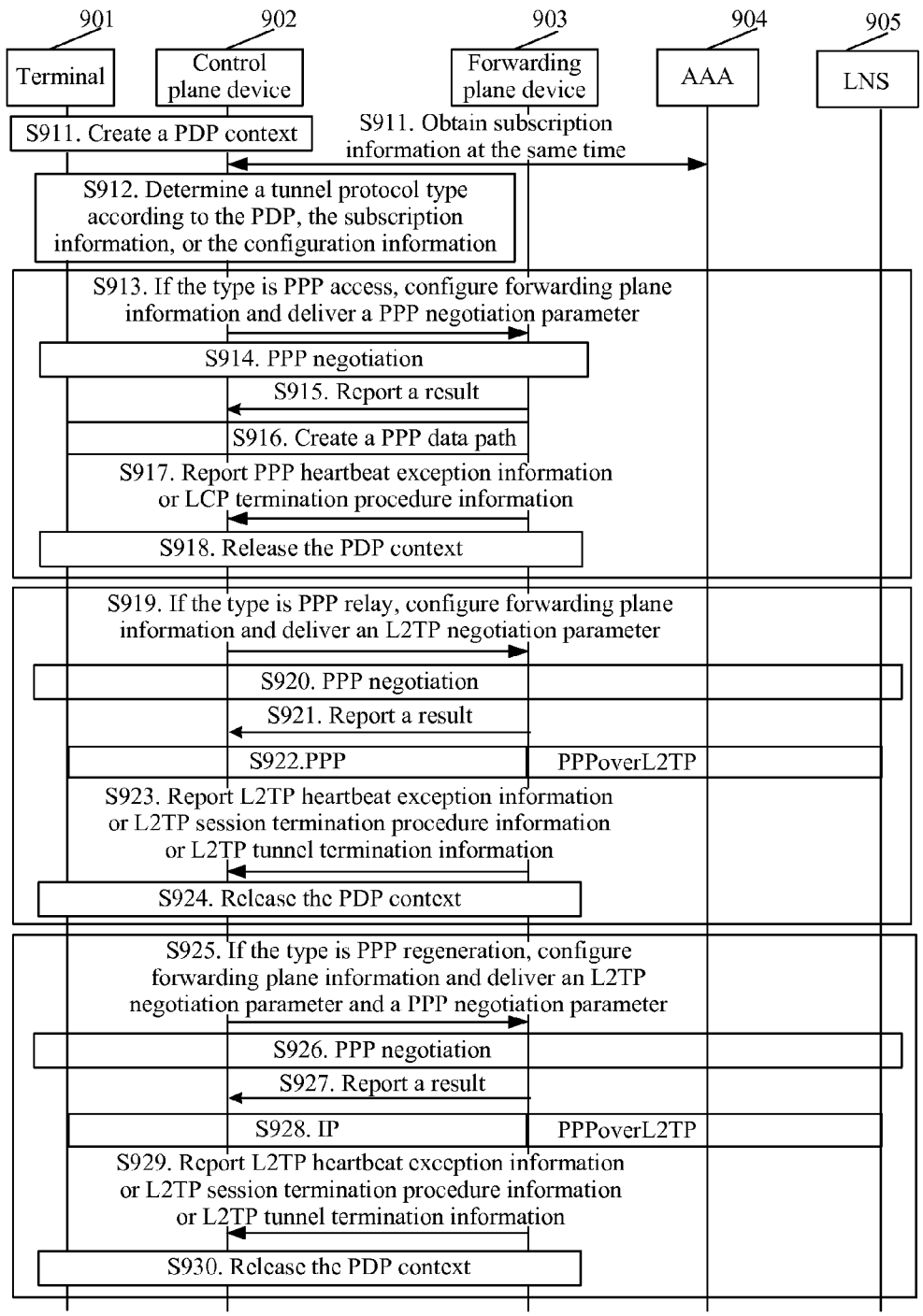
FIG. 19 is a protocol processing flowchart of a negotiation procedure performed by a forwarding plane device according to the present invention.

To expound the core ideas of the present invention more clearly, the following describes in detail the procedure of the packet service processing protocol from the perspective of a system when control is decoupled from forwarding. FIG. 19 is a protocol processing flowchart of a negotiation procedure performed by a forwarding plane device according to the present invention. The system includes a user equipment 901, a control plane device 902, a forwarding plane device 903, an AAA server 904, and an LNS server 905. The protocol processing procedure applied when control is decoupled from forwarding includes the following steps.

S911. The control plane device 902 creates a PDP context with the user equipment 901 according to a PDP context creation request initiated by the user equipment 901, and obtains subscription information from the AAA server 904.

S912. The control plane device 902 determines a tunneling protocol type according to the PDP context, the subscription information, or the configuration information of the control plane device.

If the tunneling protocol type is PPP access, the procedure proceeds to step S913.

S913. The control plane device 902 configures forwarding plane information according to the PPP access type, and delivers a PPP negotiation parameter.

S914. The forwarding plane device 903 performs a PPP negotiation procedure with the user equipment according to the received PPP negotiation parameter and with reference to its own configuration parameter, where the PPP negotiation parameter is obtained from subscription information, local configuration of a gateway, or a DHCP (Dynamic Host Configuration Protocol) server.

S915. The forwarding plane device 903 reports a negotiation success result to the control plane device 902.

S916. Create a PPP data path between the forwarding plane device 903 and the user equipment 901.

S917. The forwarding plane device 903 detects PPP heartbeat exception information in the PPP data path or information about an LCP termination procedure initiated by the user equipment, and reports the detected information to the control plane device 902.

S918. The control plane device 902 receives the information, and then initiates a PDP context release procedure.

If the tunneling protocol type is PPP relay, the procedure proceeds to step S919.

S919. The control plane device 902 configures forwarding plane information according to the PPP relay type, and delivers an L2TP negotiation parameter.

S920. The forwarding plane device 903 performs an L2TP negotiation procedure with the LNS according to the received L2TP negotiation parameter.

S921. The forwarding plane device 903 reports a negotiation success result to the control plane device 902.

S922. Create an L2TP data path between the forwarding plane device 902 and the LNS server 905, so that the user equipment 901 and the LNS server 905 can use the L2TP data path to transmit PPP data packet, thereby creating a data path between the user equipment 901 and the LNS server 905.

S923. The forwarding plane device 903 detects L2TP heartbeat exception in the L2TP data path, information about an L2TP session termination procedure initiated by the LNS server 905, or information about an L2TP tunnel termination procedure initiated by the LNS server 905, and reports the detected information to the control plane device.

S924. The control plane device 902 receives the information, and then initiates a PDP context release procedure.

If the tunneling protocol type is PPP regeneration, the procedure proceeds to step S925.

S925. The control plane device 902 configures forwarding plane device 903 information according to the PPP regeneration type, and delivers an L2TP negotiation parameter and a PPP negotiation parameter.

S926. The forwarding plane device 903 performs an L2TP negotiation procedure with the LNS according to the received L2TP negotiation parameter, performs a PPP negotiation procedure with the LNS server 905 according to the PPP negotiation parameter, and sends the IP address obtained in the PPP negotiation procedure to the user equipment 901.

S927. The forwarding plane device 903 reports a negotiation success result to the control plane device 902.

S928. Create a data path between the user equipment 901 and the LNS server 905, where the data path include an IP data path between the user equipment 901 and the forwarding plane device 903, and a PPP data path between the forwarding plane device 903 and the LNS server 905, and the PPP data path uses the L2TP data path between the forwarding plane device 903 and the LNS server 905 to transmit PPP data packet.

S929. The forwarding plane device 903 detects L2TP heartbeat exception in the L2TP data path, information about an L2TP session termination procedure initiated by the LNS server 905, or information about an L2TP tunnel termination procedure initiated by the LNS server 905, and reports the detected information to the control plane device 902.

S930. The control plane device 902 receives the information, and then initiates a PDP context release procedure.

Figure 20:
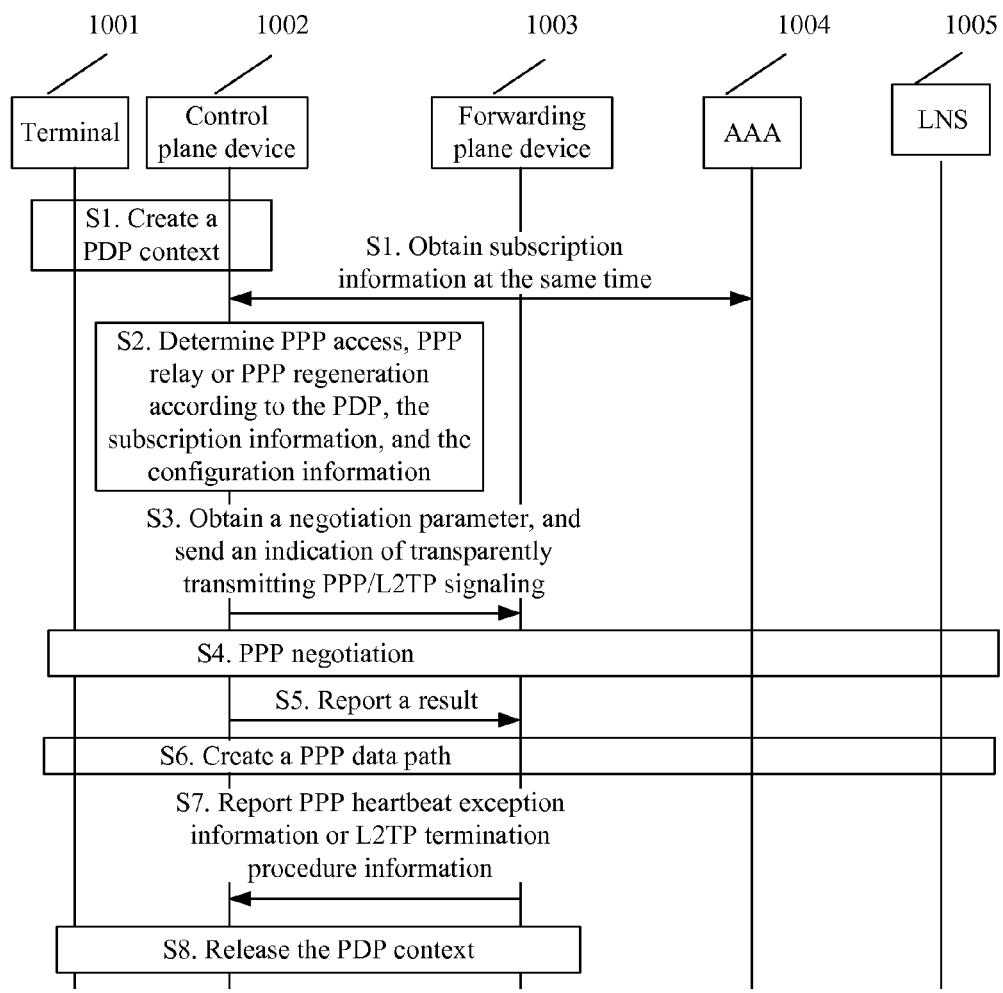
FIG. 20 is a protocol processing flowchart of a negotiation procedure performed by a control plane device according to the present invention.

FIG. 20 is a protocol processing flowchart of a negotiation procedure performed by a control plane device according to the present invention. As shown in FIG. 20, the system includes a user equipment 1001, a control plane device 1002, a forwarding plane device 1003, an AAA server 1004, and an LNS server 1005. The protocol processing procedure applied when control is decoupled from forwarding includes the following steps.

S1. The control plane device 1002 creates a PDP context with the user equipment 1001 according to a PDP context creation request initiated by the user equipment 1001, and obtains subscription information from the AAA server 1004.

S2. The control plane device 1002 determines PPP access, PPP relay, or PPP regeneration according to the PDP context, the subscription information, or the configuration information of the control plane device.

S3. The control plane device 1002 obtains a negotiation parameter, and instructs the forwarding plane device to transparently transmit PPP/L2TP signaling.

S4. The control plane device 1002 performs a PPP negotiation procedure.

S5. The control plane device delivers a negotiation success result.

S6. Create a tunneling protocol data path between the user equipment 1001 and the forwarding plane device 1002 or the LNS 1005.

S7. The forwarding plane device 1003 detects PPP heartbeat exception in the PPP data path or L2TP heartbeat exception information in the L2TP data path, and reports the detected information to the control plane device 1002.

S8. The control plane device 1002 receives the information, and then initiates a PDP context release procedure.

In the embodiment of the present invention, the negotiation parameter of the packet service processing protocol is delivered to the forwarding plane device, and the forwarding plane device performs packet service processing protocol negotiation; or, the forwarding plane device transparently transmits the negotiation packet of the packet service processing protocol to the control plane device, and the control plane device performs the negotiation. In this way, when control is decoupled from forwarding on the gateway, the control plane device can cooperate with the forwarding plane device to perform packet service processing protocol negotiation.

What is claimed is:

1. A control plane device comprising:
   a processor; and
   a computer-readable storage medium storing a program to be executed by the processor, the program including instructions for:
   sending an indication to a forwarding plane device according to a processing manner of a packet service processing protocol, wherein the processing manner of the packet service processing protocol is a Point-to-Point Protocol access;
   delivering a first Point-to-Point Protocol negotiation parameter of the packet service processing protocol to the forwarding plane device;
   receiving a Point-to-Point Protocol negotiation result of the packet service processing protocol; and
   creating a data path between a user equipment and the forwarding plane device, wherein the Point-to-Point negotiation result is uploaded by the forwarding plane device after a Point-to-Point Protocol negotiation is performed with the user equipment according to the first Point-to-Point Protocol negotiation parameter and a second Point-to-Point Protocol negotiation parameter that is configured by the forwarding plane device itself, and wherein the first and second Point-to-Point Protocol negotiation parameters together provide the complete negotiation parameter.

2. The control plane device according to claim 1, wherein the program includes further instructions for:
   receiving a packet data protocol context creation request initiated by the user equipment after the user equipment gets attached to a mobile communication network;
   creating a packet data protocol context between the control plane device and the user equipment;
   obtaining subscription information from an authentication authorization accounting server; and
   determining a processing manner of the packet service processing protocol according to the packet data protocol context, the subscription information, or configuration information of the control plane device.

3. The control plane device according to claim 1, wherein the first Point-to-Point Protocol negotiation parameter comprises an IP address, a Point-to-Point Protocol authentication manner, a Point-to-Point Protocol authentication parameter, and a Point-to-Point Protocol heartbeat cycle, and
   wherein the second Point-to-Point Protocol negotiation parameter comprises a maximum receiving unit, information indicating whether a protocol field in a Point-to-Point Protocol packet header is compressed, and information indicating whether an address field and a control field in the Point-to-Point Protocol packet header are compressed and whether an IP packet is compressed.

4. The control plane device according to claim 2, wherein the processing manner of the packet service processing protocol is Point-to-Point Protocol relay and wherein the program includes further instructions for:
   receiving a negotiation result; and
   creating a data path between the user equipment and a Layer Two Tunneling Protocol network server, wherein the forwarding plane device performs Layer Two Tunneling Protocol negotiation with a Layer Two Tunneling Protocol network server according to a Layer Two Tunneling Protocol negotiation parameter, and creates a Layer Two Tunneling Protocol data path between the forwarding plane device and the Layer Two Tunneling Protocol network server, and the forwarding plane device provides a Layer Two Tunneling Protocol access concentrator function, so that the user equipment can perform Point-to-Point Protocol negotiation with the Layer Two Tunneling Protocol network server by using the Layer Two Tunneling Protocol data path and the forwarding plane device reports the negotiation result.

5. The control plane device according to claim 2, wherein the processing manner of the packet service processing protocol is Point-to-Point Protocol regeneration and wherein the program includes further instructions for:
   receiving a negotiation result; and
   creating a data path between the user equipment and a Layer Two Tunneling Protocol network server, wherein the forwarding plane device performs Layer Two Tunneling Protocol negotiation with a Layer Two Tunneling Protocol network server according to a Layer Two Tunneling Protocol negotiation parameter, and creates a Layer Two Tunneling Protocol data path between the forwarding plane device and the Layer Two Tunneling Protocol network server, so that the forwarding plane device performs Point-to-Point Protocol negotiation with the Layer Two Tunneling Protocol network server by using the Layer Two Tunneling Protocol data path according to a first Point-to-Point Protocol negotiation parameter and a second Point-to-Point Protocol negotiation parameter that is configured by the forwarding plane device itself and reports the negotiation result, and the forwarding plane device provides a Layer Two Tunneling Protocol access concentrator function.

6. The control plane device according to claim 2, wherein the program includes further instructions for receiving data path release information uploaded by the forwarding plane device and initiating a packet data protocol context release procedure.

7. A forwarding plane device comprising:
   a processor; and
   a computer-readable storage medium storing a program to be executed by the processor, the program including instructions for:
   receiving a negotiation parameter of a packet service processing protocol and an indication of a processing manner of the packet service processing protocol that are delivered by a control plane device, wherein the processing manner of the packet service processing protocol is Point-to-Point Protocol relay;
   negotiating according to the indication and with reference to information that comprises the negotiation parameter of the packet service processing protocol; and
   reporting a negotiation result to the control plane device to create a data path between a user equipment and a network device,
   wherein the program further includes instructions for performing Layer Two Tunneling Protocol negotiation with a Layer Two Tunneling Protocol network server according to a Layer Two Tunneling Protocol negotiation parameter, and for creating a Layer Two Tunneling Protocol data path between the forwarding plane device and the Layer Two Tunneling Protocol network server, and
   wherein the forwarding plane device provides a Layer Two Tunneling Protocol access concentrator function according to a first Point-to-Point Protocol negotiation parameter and a second Point-to-Point Protocol negotiation parameter that is configured by the forwarding plane device itself, so that the user equipment and the Layer Two Tunneling Protocol network server can use the Layer Two Tunneling Protocol data path to perform Point-to-Point Protocol negotiation and report a negotiation result to the control plane device to create a data path between the user equipment and the Layer Two Tunneling Protocol network server.

8. The forwarding plane device according to claim 7, wherein the program includes further instructions for:
receiving a first Point-to-Point Protocol negotiation parameter and a Point-to-Point Protocol access indication that are delivered by the control plane device;
performing Point-to-Point Protocol negotiation with the user equipment according to the first Point-to-Point Protocol negotiation parameter and a second Point-to-Point Protocol negotiation parameter that is configured by the forwarding plane device itself; and
reporting a negotiation result to the control plane device to create a data path between the user equipment and the forwarding plane device.

9. The forwarding plane device according to claim 8, wherein:
the first Point-to-Point Protocol negotiation parameter comprises an IP address, a Point-to-Point Protocol authentication manner, a Point-to-Point Protocol authentication parameter, and a Point-to-Point Protocol heartbeat cycle; and
the second Point-to-Point Protocol negotiation parameter comprises a maximum receiving unit, information indicating whether a protocol field in a Point-to-Point Protocol packet header is compressed, and information indicating whether an address field and a control field in the Point-to-Point Protocol packet header are compressed and whether an IP packet is compressed.

10. A control plane device comprising:
a processor; and
a computer-readable storage medium storing a program to be executed by the processor, the program including instructions for:
obtaining a second Point-to-Point Protocol negotiation parameter of a packet service processing protocol that is configured by a forwarding plane device itself;
determining a processing manner of the packet service processing protocol according to a packet data protocol context, a subscription information, or a configuration information of the control plane device, wherein the processing manner of the packet service processing protocol is Point-to-Point Protocol access;
instructing the forwarding plane device to transparently transmit a negotiation packet of the packet service processing protocol to the control plane device;
performing packet service processing protocol negotiation wherein performing the packet service protocol negotiation comprises performing a Point-to-Point Protocol negotiation with a user equipment according to a first Point-to-Point Protocol negotiation parameter and the second Point-to-Point Protocol negotiation parameter; and
delivering a negotiation result to the forwarding plane device to create a data path between the user equipment and the forwarding plane device,
wherein the first and second Point-to-Point Protocol negotiation parameters together provide a complete negotiation parameter.

11. The control plane device according to claim 10, wherein the program includes further instructions for:
receiving a packet data protocol context creation request initiated by the user equipment;
creating the packet data protocol context between the control plane device and the user equipment; and
obtaining subscription information from an authentication authorization accounting server.

12. The control plane device according to claim 11, wherein
the second Point-to-Point Protocol negotiation parameter is a negotiation parameter of the packet service processing protocol and configured by the forwarding plane device itself, wherein
the first Point-to-Point Protocol negotiation parameter is a negotiation parameter obtained by the control plane device from subscription information, local configuration of a gateway, or a Dynamic Host Configuration Protocol server, wherein
the first Point-to-Point Protocol negotiation parameter comprises an IP address, a Point-to-Point Protocol authentication manner, a Point-to-Point Protocol authentication parameter, and a Point-to-Point Protocol heartbeat cycle, wherein and
the second Point-to-Point Protocol negotiation parameter comprises a maximum receiving unit, information indicating whether a protocol field in a Point-to-Point Protocol packet header is compressed, and information indicating whether an address field and a control field in the Point-to-Point Protocol packet header are compressed and whether an IP packet is compressed.

13. The control plane device according to claim 11, wherein the program includes further instructions for:
receiving data path release information uploaded by the forwarding plane device; and
initiating a packet data protocol context release procedure according to the data path release information.

14. A forwarding plane device comprising:
a processor; and
a computer-readable storage medium storing a program to be executed by the processor, the program including instructions for:
receiving a negotiation parameter of a packet service processing protocol and an indication of a processing manner of the packet service processing protocol that are delivered by a control plane device, wherein the processing manner of the packet service processing protocol is Point-to-Point Protocol regeneration;
negotiating according to the indication and with reference to information that comprises the negotiation parameter of the packet service processing protocol; and
reporting a negotiation result to the control plane device to create a data path between a user equipment and a network device,
wherein the program further includes instructions for performing Layer Two Tunneling Protocol negotiation with a Layer Two Tunneling Protocol network server according to a Layer Two Tunneling Protocol negotiation parameter, and for creating a Layer Two Tunneling Protocol data path between the forwarding plane device and the Layer Two Tunneling Protocol network server, so that the forwarding plane device and the Layer Two Tunneling Protocol network server use the Layer Two Tunneling Protocol data path to perform Point-to-Point Protocol negotiation according to a first Point-to-Point Protocol negotiation parameter and a second Point-to-Point Protocol negotiation parameter that is configured by the forwarding plane device itself, and to report a negotiation result to the control plane device, and wherein the forwarding plane device provides a Layer Two Tunneling Protocol access concentrator function according to the first Point-to-Point Protocol negotiation parameter and the second Point-to-Point Protocol negotiation parameter that is configured by the forwarding plane device itself to create a data path between the user equipment and the Layer Two Tunneling Protocol network server.

15. A forwarding plane device comprising:

a processor; and a computer-readable storage medium storing a program to be executed by the processor, the program including instructions for:

receiving a negotiation parameter of a packet service processing protocol and an indication of a processing manner of the packet service processing protocol that are delivered by a control plane device;

negotiating according to the indication and with reference to information that comprises the negotiation parameter of the packet service processing protocol; and reporting a negotiation result to the control plane device to create a data path between a user equipment and a network device, wherein the program further includes instructions to upload detected information as data path release information to the control plane device, so that the control plane device initiates a packet data protocol context release procedure, and wherein the detected information comprises Layer Two Tunneling Protocol heartbeat exception information, information about a Layer Two Tunneling Protocol session termination procedure initiated by a Layer Two Tunneling Protocol network server, information about a Layer Two Tunneling Protocol data path termination procedure initiated by the Layer Two Tunneling Protocol network server, Point-to-Point Protocol heartbeat exception information, or information about a link control protocol termination procedure initiated by the user equipment.

16. A control plane device comprising:

a processor; and a computer-readable storage medium storing a program to be executed by the processor, the program including instructions for:

obtaining a negotiation parameter of a packet service processing protocol that is configured by a forwarding plane device itself;

determining a processing manner of the packet service processing protocol according to a packet data protocol context, a subscription information, or a configuration information of the control plane device, wherein the processing manner of the packet service processing protocol is Point-to-Point Protocol relay;

instructing the forwarding plane device to transparently transmit a negotiation packet of the packet service processing protocol to the control plane device;

performing packet service processing protocol negotiation according to information that comprises the negotiation parameter of the packet service processing protocol; and delivering a negotiation result to the forwarding plane device to create a data path between a user equipment and a network device, wherein performing packet service processing protocol negotiation comprises performing Layer Two Tunneling Protocol negotiation with a Layer Two Tunneling Protocol network server according to a Layer Two Tunneling Protocol negotiation parameter, and wherein delivering the negotiation result to the forwarding plane device comprises delivering the negotiation result to the forwarding plane device to create a Layer Two Tunneling Protocol data path between the forwarding plane device and the Layer Two Tunneling Protocol network server, so that the user equipment and the Layer Two Tunneling Protocol network server can use the Layer Two Tunneling Protocol data path to perform a Point-to-Point Protocol negotiation between the user equipment and the Layer Two Tunneling Protocol network server, and creating a data path between the user equipment and the Layer Two Tunneling Protocol network server.

17. A control plane device comprising:

a processor; and a computer-readable storage medium storing a program to be executed by the processor, the program including instructions for:

obtaining a negotiation parameter of a packet service processing protocol that is configured by a forwarding plane device itself;

determining a processing manner of the packet service processing protocol according to a packet data protocol context, a subscription information, or a configuration information of the control plane device, wherein the processing manner of the packet service processing protocol is Point-to-Point Protocol regeneration;

instructing the forwarding plane device to transparently transmit a negotiation packet of the packet service processing protocol to the control plane device;

performing packet service processing protocol negotiation according to information that comprises the negotiation parameter of the packet service processing protocol; and delivering a negotiation result to the forwarding plane device to create a data path between a user equipment and a network device, wherein performing packet service processing protocol negotiation comprises performing Layer Two Tunneling Protocol negotiation with a Layer Two Tunneling Protocol network server according to a Layer Two Tunneling Protocol negotiation parameter, and wherein delivering the negotiation result to the forwarding plane device comprises delivering the negotiation result to the forwarding plane device to create a Layer Two Tunneling Protocol data path between the forwarding plane device and a Layer Two Tunneling Protocol network server, so that the control plane device and the Layer Two Tunneling Protocol network server use the Layer Two Tunneling Protocol data path to perform Point-to-Point Protocol negotiation according to a first Point-to-Point Protocol negotiation parameter and a second Point-to-Point Protocol negotiation parameter and deliver a negotiation result to the forwarding plane device to create a data path between the user equipment and the Layer Two Tunneling Protocol network server.

* * * * *